(12) United States Patent
Uchiyama

(10) Patent No.: US 7,362,966 B2
(45) Date of Patent: Apr. 22, 2008

(54) CONTROLLING APPARATUS FOR PHOTOGRAPHING SYSTEM

(75) Inventor: Minoru Uchiyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 309 days.

(21) Appl. No.: 11/185,653

(22) Filed: Jul. 20, 2005

(65) Prior Publication Data

US 2006/0023091 A1    Feb. 2, 2006

(30) Foreign Application Priority Data

Jul. 30, 2004    (JP) .............................. 2004-224778

(51) Int. Cl.
*G03B 17/00*    (2006.01)

(52) U.S. Cl. .................... 396/60; 396/55; 348/240.1; 348/240.99

(58) Field of Classification Search ............... 396/55, 396/60; 348/240.1, 240.99
See application file for complete search history.

(56) References Cited

U.S. PATENT DOCUMENTS

| | | | |
|---|---|---|---|
| 5,065,172 A | 11/1991 | Ogawa | |
| 5,557,328 A | 9/1996 | Ishihama et al. | |
| 6,141,158 A | 10/2000 | Kaneda | |
| 6,559,888 B1 * | 5/2003 | Doron | 348/240.1 |
| 6,564,012 B2 * | 5/2003 | Cornell et al. | 396/85 |
| 6,650,368 B1 * | 11/2003 | Doron | 348/240.2 |
| 6,801,719 B1 * | 10/2004 | Szajewski et al. | 396/333 |
| 2001/0003464 A1 | 6/2001 | Niikawa | |
| 2003/0117511 A1 * | 6/2003 | Belz et al. | 348/333.11 |
| 2004/0012623 A1 * | 1/2004 | Yashiro et al. | 345/723 |
| 2004/0119852 A1 * | 6/2004 | Shin | 348/240.2 |
| 2004/0136704 A1 * | 7/2004 | Usui | 396/55 |
| 2004/0184163 A1 * | 9/2004 | Nishioka et al. | 359/726 |
| 2004/0189826 A1 * | 9/2004 | Karasawa | 348/231.3 |
| 2004/0189830 A1 * | 9/2004 | Pollard | 348/240.1 |
| 2004/0246365 A1 * | 12/2004 | Hirai | 348/369 |
| 2005/0094019 A1 * | 5/2005 | Grosvenor et al. | 348/335 |
| 2005/0219386 A1 * | 10/2005 | Stavely et al. | 348/240.3 |

* cited by examiner

*Primary Examiner*—W. B. Perkey
*Assistant Examiner*—Warren K Fenwick
(74) *Attorney, Agent, or Firm*—Cowan, Liebowitz & Latman, P.C.

(57) ABSTRACT

To provide a controlling apparatus for a photographing system that enables effective use of a memory zoom function regardless of whether a zoom position is within an optical-zoom region or a digital zoom region. The present invention provides a controlling apparatus for a photographing system having an optical-zoom region and a digital zoom region, including a zoom controlling unit for making the photographing system perform a memory zoom operation which is a zoom operation to a zoomed state stored in a storage unit. In addition, the zoom controlling unit makes the photographing system perform the memory zoom operation from a first zoomed state corresponding to one of the optical-zoom region and the digital zoom region to a second zoomed state which corresponds to the other zoom region and is stored in the storage unit.

4 Claims, 21 Drawing Sheets

| FIG. 12A | FIG. 12B |

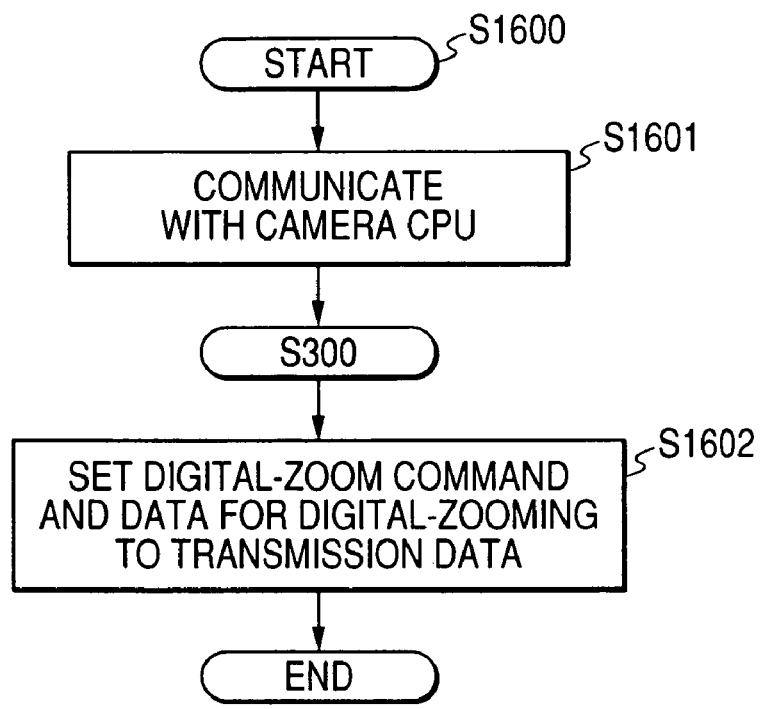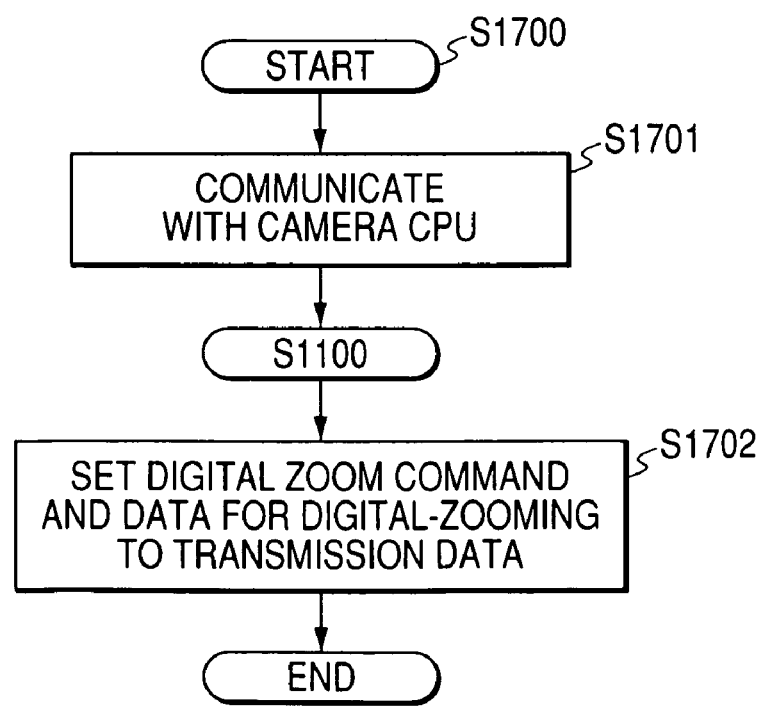

CONTROLLING APPARATUS FOR PHOTOGRAPHING SYSTEM

BACKGROUND OF THE INVENTION

1. Field of the Invention

The present invention relates to a photographing system constituted by a lens apparatus and an image pickup apparatus, and more particularly to a controlling apparatus for controlling a zoom operation in a photographing system such as a video camera, a still camera, or a monitoring camera.

2. Related Background Art

In many cases, a photographing system includes an optical-zooming function which changes a photographing field angle by moving a lens. In addition, some of the photographing systems have a digital-zooming function which electronically magnifies and reduces photographed image data. Besides, a photographing system has been proposed in which a zoom magnification virtually larger than a zoom magnification obtained in a case where an optical-zoom only is employed is obtained by using both the optical-zoom and the digital-zoom. In this regard, in Japanese Patent Application Laid-Open No. H09-243899 (paragraphs 0042 through 0046, FIG. 8, and the like), a technology in an interchangeable lens type photographing system in which zooming is carried out by smoothly shifting the optical-zoom and the digital-zoom from each other is proposed.

On the other hand, there is a professional-use photographing system which is equipped with a so-called preset zoom function (see Japanese Patent No. 3387889 (paragraphs 0027 through 0030, FIGS. 1 and 2, and the like)). The preset zoom function is a function in which an optical-zoom position is stored in a memory in advance and a zoom operation to the stored optical-zoom position is performed when a preset zoom switch is operated at an arbitrary optical-zoom position. The preset zoom function is convenient in a case where a zoom operation to a prescribed zooming position at a constant speed is repeated many times.

In addition, in Japanese Patent No. 3372912 (paragraph 0036, FIG. 1, and the like), the photographing system including a so-called shuttle shot zoom function is disclosed. The shuttle shot zoom function is an enhanced preset zoom function. That is, with the shuttle shot zoom function, when the preset zoom switch is operated at an arbitrary optical-zoom position, the arbitrary optical-zoom position is stored in the memory. After that, in accordance with the termination of preset zoom operation to a zoom position which is preset or an interruption of operation of the preset zoom switch during the preset zoom operation, the zooming operation to an original zoom position is performed by inverting the direction of zooming.

This function is used, for example, in a case where a tele-photo end is stored in the memory in advance, and a photographer wants to check whether a lens is focused or not after determining a composition at the arbitrary zoom position. In other words, the shuttle shot zoom function is convenient in a case where the zooming is performed once to the tele-photo end to confirm whether or not the lens is focused and then the zoom position is returned to an original position to start photographing, and where the photographing is performed alternately at arbitrary two zoom positions.

However, the preset zoom function and the shuttle shot zoom function which are mentioned above (hereinafter, both of them are referred to collectively as memory zoom function; and the operation thereof is hereinafter referred to as a memory zoom operation) are functions related to the optical-zoom. In the memory zoom function, the digital-zoom is not considered.

In this regard, it is inconvenient that the memory zoom function mentioned above can be used only in an optical-zoom region in the photographing system in which a large zoom magnification can be obtained by a combination of the optical-zoom and the digital-zoom.

SUMMARY OF THE INVENTION

An object of the present invention is to provide a photographing system in which the memory zoom function can be effectively used regardless of whether the zooming is operated in the optical-zoom region or the digital zoom region.

In order to achieve the above-described object, the present invention provides a controlling apparatus for a photographing system having an optical-zoom region and a digital zoom region, including zoom controlling means in which the photographing system performs a memory zoom operation which is a zoom operation to a zoomed state stored in storage means. In addition, the zoom controlling means controls the photographing system to perform the memory zoom operation from a first zoomed state within one of the optical-zoom region and the digital zoom region to a second zoomed state within the other zoom region and stored in the storage means.

Note that the memory zoom operation includes a preset zoom operation, a shuttle shot zoom operation, and the like.

According to the present invention, regardless of whether each of a start position and a stop position of the memory zoom operation (the position stored in the memory) is in the optical-zoom region or in the digital zoom region, the memory zoom function can be utilized. In other words, a photographer can utilize the memory zoom function without being aware of whether the zoom is performed in the optical-zoom region or in the digital-zoom region.

BRIEF DESCRIPTION OF THE DRAWINGS

FIG. 16 is a flow chart explaining an operation of the lens microcomputer according to the third embodiment of the present invention;

FIG. 17 is a flow chart explaining an operation of the lens microcomputer according to the third embodiment of the present invention;

DESCRIPTION OF THE PREFERRED EMBODIMENTS

Embodiments of the present invention will be described in detail below with reference to the drawings.

First Embodiment

Figure 1:
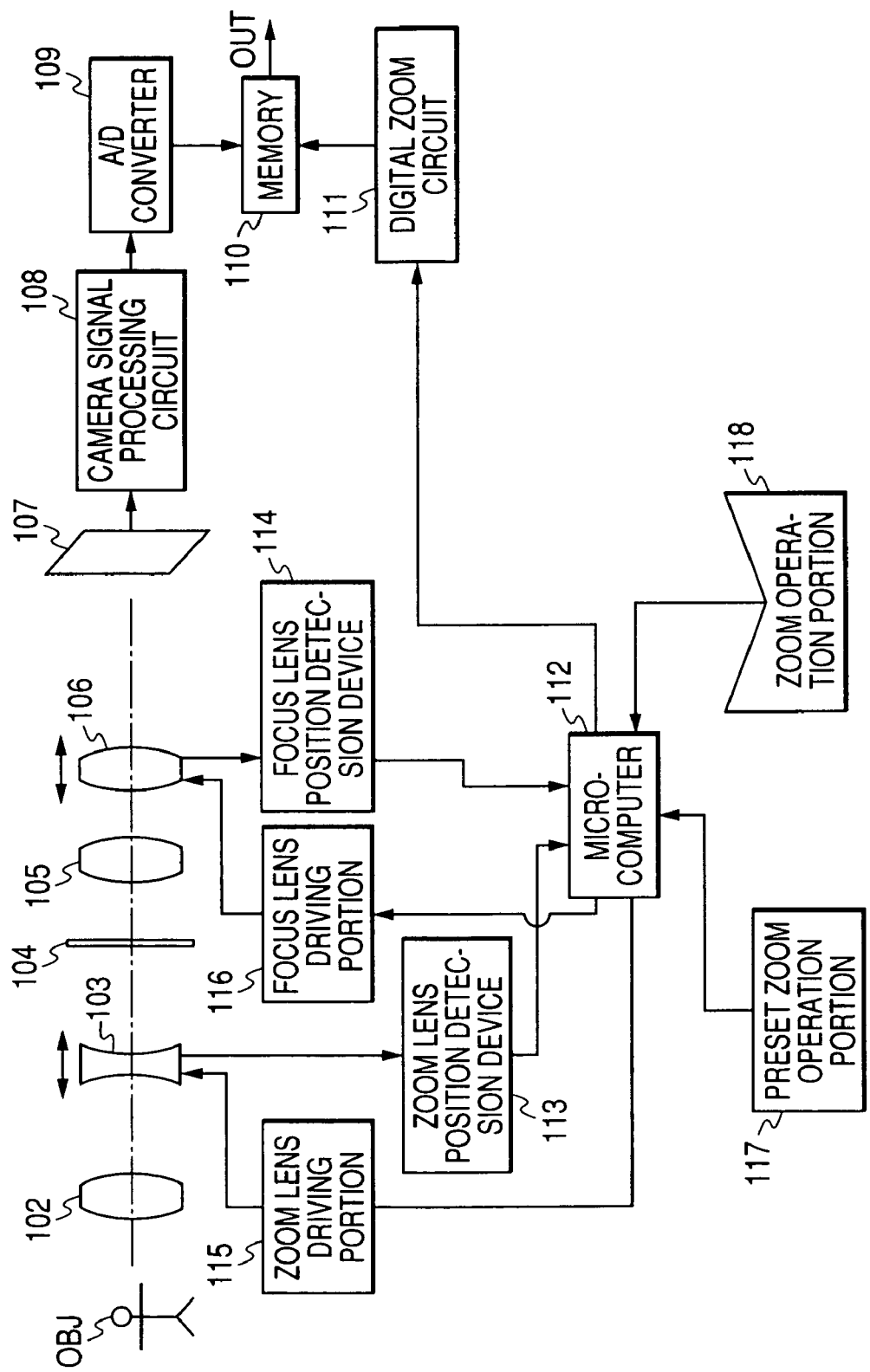
FIG. 1 is a block diagram showing a constitution of a lens-incorporated video camera (a photographing system) according to a first embodiment of the present invention.

Embodiments of the present invention will be described in detail below with reference to the drawings. FIG. 1 shows a constitution of a photographing system of a first embodiment of the present invention. In the first embodiment, a preset zoom function in a lens-incorporated video camera is explained.

The photographing system includes a so-called rear focus type photographing optical system. Light from an object OBJ incident into the optical system passes through a first lens 102, which is fixed; a second lens (variator lens) 103 for zooming; an iris 104 for adjusting light quantity; a third lens 105, which is fixed; and a fourth lens (focus lens) 106 for focusing to form an image on an image sensor 107 such as a CCD sensor and CMOS sensor.

An electric signal generated by a photoelectric conversion operation by the image sensor 107 is sent to a camera signal processing means 108. The electric signal is converted into an analog video signal by a signal processing of such as signal amplification. Further, the analog video signal is converted into a digital video signal by means of an A/D converter 109. The digital video signal is sent to a memory 110. The memory 110 temporarily stores the video signal.

Here, a digital-zoom circuit 111 carries out a zoom processing of the digital video signal stored in the memory 110, on the basis of a zoom magnification signal by a microcomputer 112. In order to obtain a zoom magnification not less than 1, the digital-zoom circuit 111 thins out image signals stored in the memory 110, and carries out the zoom processing by interpolating the image signals which are thinned out by means of various methods.

By carrying out the zoom processing like this by altering a magnification smoothly in terms of time, it becomes possible to obtain a moving image which is zoomed in or zoomed out.

The video signal in the memory 110 which is processed into a video of an appropriate magnification by the digital-zoom circuit 111 is then subjected to processings such as a color correction processing and a white balance processing. After that, the video signal is outputted to a recording medium (such as a semiconductor memory, an optical disk, or a magnetic tape) or an external device such as a personal computer or a television monitor.

The microcomputer 112 reads a zoom command signal outputted from a zoom operation portion 118, which is operated in order to change an amount of zooming (magnification).

Figure 4:
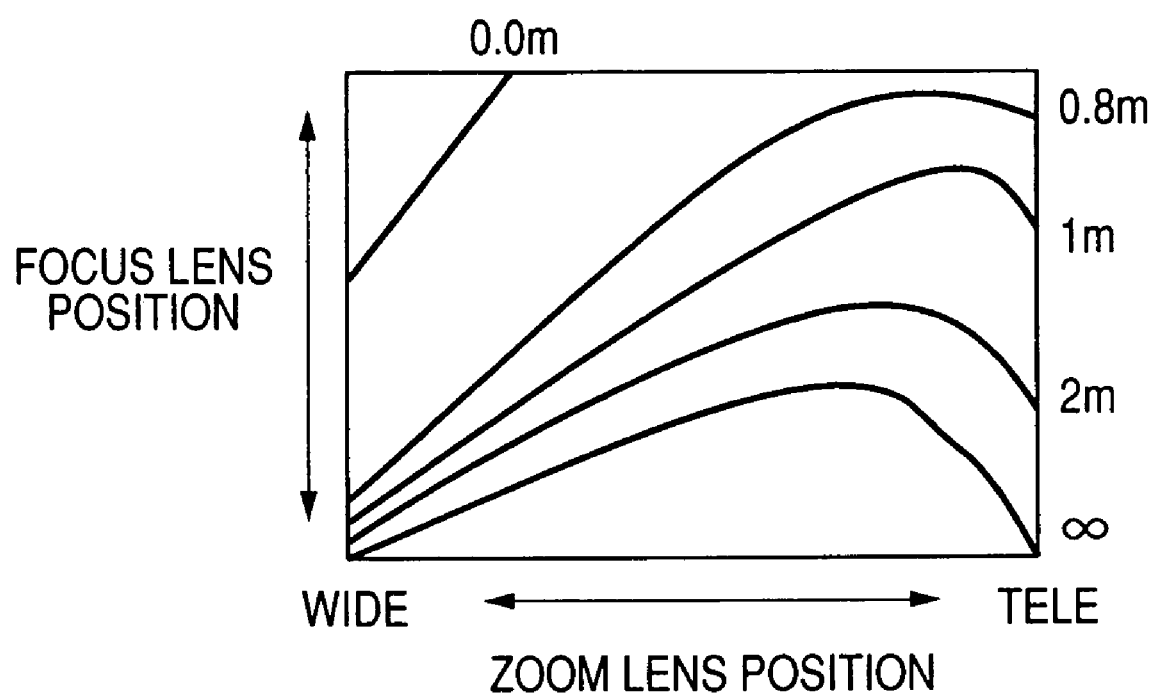
FIG. 4 is a graph showing a relationship of a lens position in an inner focusing system zoom lens.

Here, an explanation will be made as to a case where the microcomputer 112 carries out an optical-zoom control. In a rear focus type optical system as in this embodiment, the lens cannot be focused by merely moving a variator lens 103 in order to perform zooming. This is because the relationship between a position of the variator lens 103 (zoom lens) and the position of a focus lens 106 for keeping a focused state varies in a complicated manner depending on an object distance as shown in FIG. 4. Accordingly, the microcomputer 112 detects the position of the variator lens 103 and the focus lens 106 by means of a zoom lens position detection device 113 and a focus lens position detection device 114. In addition, the microcomputer 112 moves the zoom lens 103 and the focus lens 106 by means of a zoom lens driving portion 115 and a focus lens driving portion 116, respectively, so that a lens positional relationship as shown in FIG. 4 can be established when a zoom command is outputted by a zoom operation portion 118.

Figure 2:
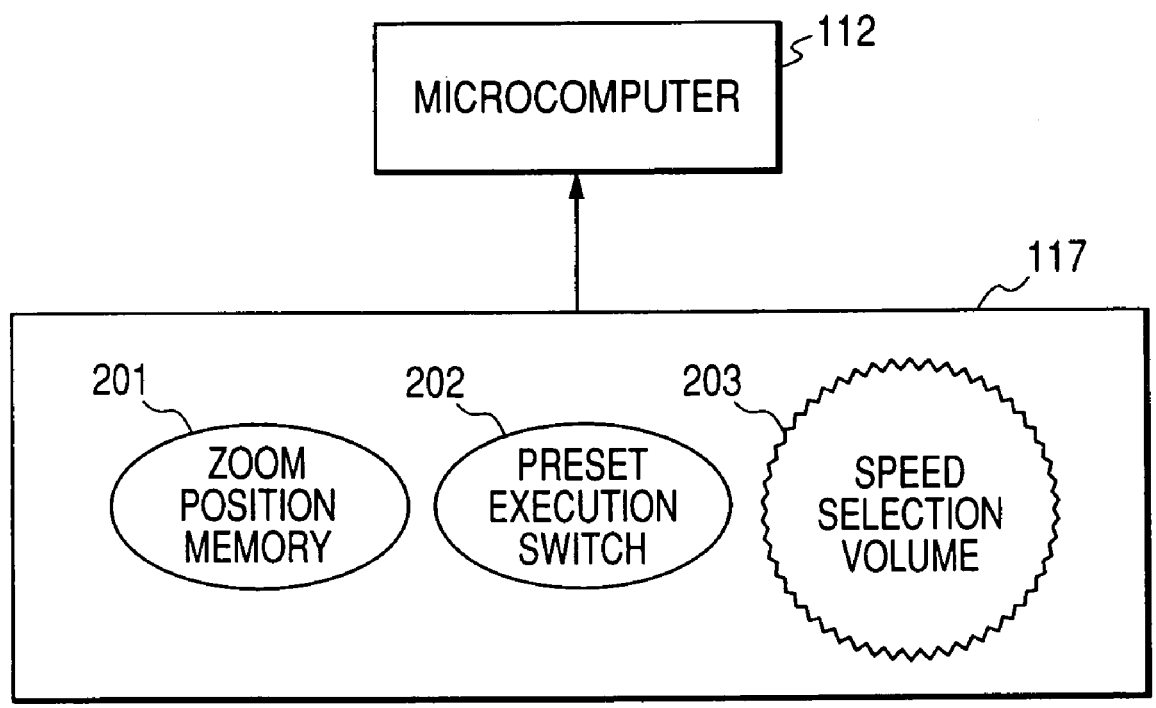
FIG. 2 is a diagram showing a constitution of the preset zoom operation portion according to the first embodiment of the present invention.

In addition, the video camera is provided with a preset zoom operation portion 117, as an exclusive operation member of the preset zoom function, which is one of the memory zoom functions as a zoom auxiliary function. The preset zoom operation portion 117 includes, as shown in FIG. 2, a zoom position memory 201 for storing a present zoom position as a preset position; a preset execution switch 202 for executing a preset zoom operation which is one of memory zoom operations which are zoom operations to the zoom position stored in the zoom position memory 201; and a speed selection volume 203 for selecting a zooming speed in the preset zoom operation by a user. The preset execution switch 202 and the speed selection volume 203 are electrical parts. The microcomputer 112 detects output signals from the preset execution switch 202 and the speed selection volume 203.

Figure 5A:
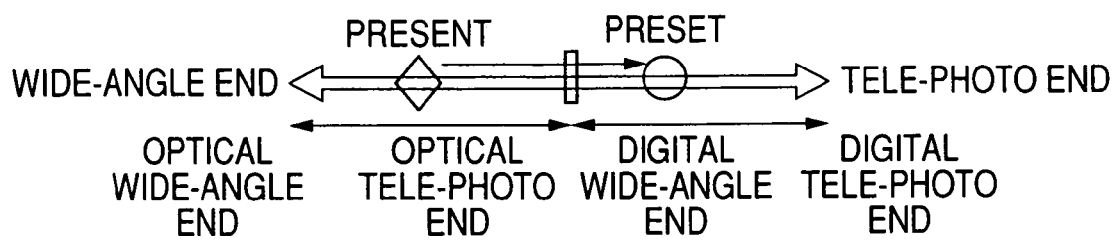
FIGS. 5A and 5B are diagrams explaining a preset zoom operation from an optical-zoom region to a digital zoom region according to the first embodiment of the present invention.

As described above, the video camera of this embodiment is capable of carrying out the optical-zoom which is performed by moving the variator lens 103 and the focus lens 106 in conjunction with each other, and the digital-zoom in which the zooming is performed by means of image processing of the video signal. More specifically, the zooming in a low magnification region is carried out by means of the optical-zoom, and the zooming by the digital-zoom is carried out in a region of larger magnification than optical-zoom limit (tele-photo end). That is, as shown in FIG. 5A, the zooming within a region of a low magnification (wide-angle end) is carried out by means of the optical-zoom, and the zoom operation by means of the digital-zoom is not performed up to the maximum magnification of the optical-zoom. The zoom operation by means of the digital-zoom is performed when the zoom operation to tele-photo direction exceeding the maximum magnification of the optical-zoom is performed.

Figure 5B:
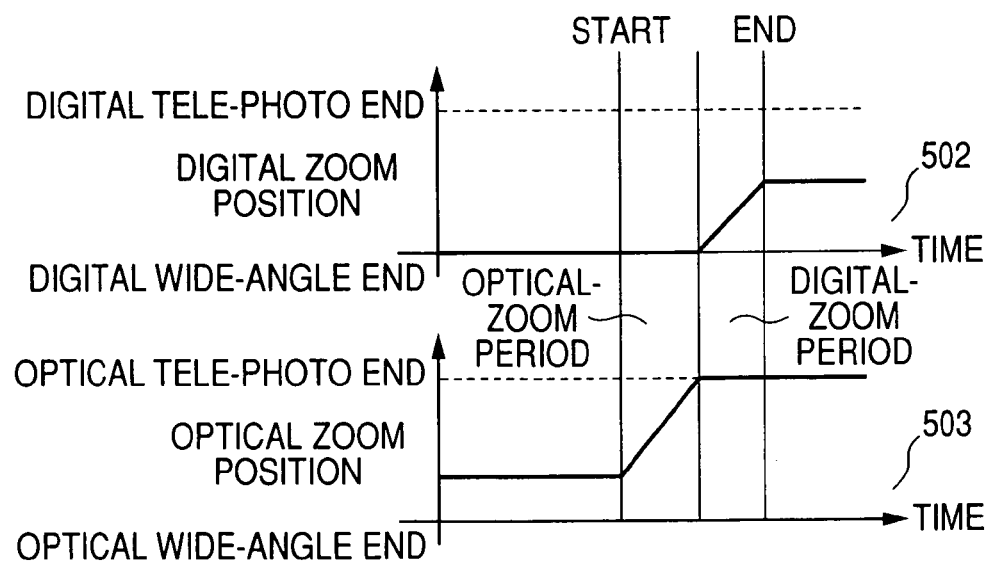

Note that in FIG. 5B, the zoom position of which the magnification of the digital-zoom is set to 1 is indicated as a digital wide-angle end, and the marginal position on a high magnification side of the digital-zoom is indicated as a digital tele-photo end. In a case of the digital-zoom, the marginal value can be changed to any value through image processing. However, in FIG. 5B, a marginal magnification at which a deterioration of image quality occurs within tolerance is determined as the digital tele-photo end. In addition, a zooming region obtained by the optical-zoom is called as an optical-zoom region and a zooming region obtained by the digital-zoom is called as the digital zoom region.

In addition, this embodiment is constituted so that the optical-zoom region and the digital zoom region do not overlap each other and that the zoom position belongs only to either one of the optical-zoom region and the digital zoom region. However, in order to smoothly carry out shifting between the optical-zoom region and the digital zoom region (that is, in order to make any joint between the zoom regions inconspicuous), a region in which the optical-zoom region and the digital zoom region overlap each other may be provided (see Japanese Patent Application Laid-Open No. H09-243899 (paragraphs 0042 through 0046, FIG. 8, etc.)).

Next, a control of the preset zoom operation in the microcomputer 112 will be explained. The preset zoom operation (function) is an operation such that when the preset execution switch 202 is operated while the zoom position is at a desired position, the zoom position is stored in the zoom position memory 201, and after that, the zoom operation is performed to the zoom position stored in the zoom position memory 201 in advance in accordance with the operation of the preset execution switch 202 in a state in which the zooming position is located at an arbitrary zoom position.

Figure 9:
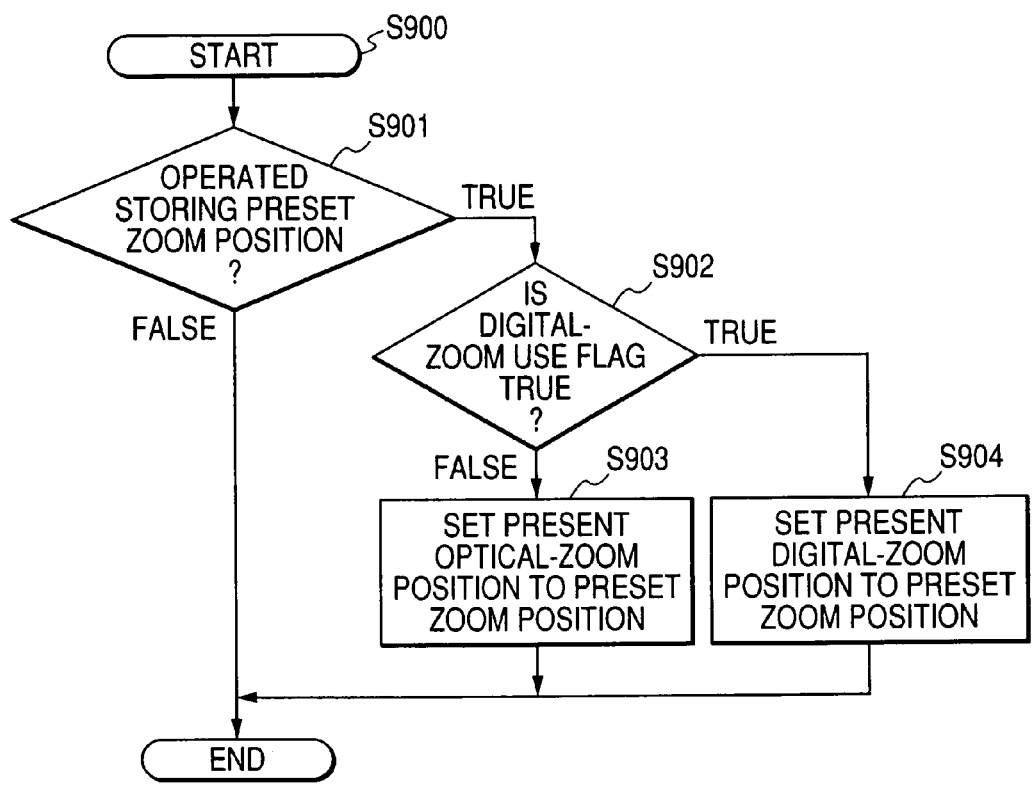
FIG. 9 is a flow chart explaining a storing processing of a preset position according to the first embodiment of the present invention.

FIG. 9 is a flow chart explaining a registration processing (preset processing of S900) of the zoom position for the preset zoom operation. In FIG. 9, first, in a step (abbreviated as S hereafter) 901, the microcomputer 112 determines whether an operation for storing the zoom position in the zoom position memory 201 (an operation of the preset execution switch 202) has been performed or not. In a case where the operation has been performed, in S902, it is checked whether a digital-zoom use flag is currently set or not. When the digital-zoom use flag is set (TRUE), it shows that the present zoom position is in the digital zoom region, and when the digital-zoom use flag is not set (FALSE), it shows that the present zoom position is in the optical-zoom region.

When the digital-zoom use flag is not set, the processing proceeds to S903. In S903, the microcomputer 112 stores information on the zoom lens position obtained by a zoom lens position detection device 113 in the zoom position memory 201. In addition, when the digital-zoom use flag is set, the processing proceeds to S904. In S904, a digital-zoom magnification which is sent to the digital-zooming circuit 111 is read and the digital-zoom magnification is stored in the zoom position memory 201. A series of the registration processing (S900) is carried out at regular time intervals and the zoom position stored in the zoom position memory 201 is sequentially updated.

Here, in the above explanation, the explanation is made as to a case where the zoom position is stored in the zoom position memory 201, but the stored zoomed state may take any form. For example, an optical-zoom state may be stored as an encoder value of an actual zoom lens position or as a focal distance of a photography optical system which is calculated from the encoder value. In addition, the form may be different between a rear focus type and a front focus type. Besides, the zoomed state in the digital zoom region may be a state expressed as the digital-zoom magnification which is sent from the microcomputer 112 to the digital-zooming circuit 111, a ratio of an output image range in relation to an effective image pickup region of the image pickup element, a thinning amount of scanning lines, and the like.

Further, the zoomed state can be expressed by the focal distance corresponding to a synthesis zoom magnification, which is calculated by multiplying an optical focal distance by the digital-zoom magnification. This is effective in a case, for example, of a zooming system having a region in which, the optical-zoom region and the digital zoom region mentioned above are overlapping each other. This will be explained later.

Next, a zoom operation processing (S300) to a zoom position which has been preset (hereafter referred to as a preset position) will now be explained with reference to the flow charts of FIGS. 3A and 3B.

First, in S301, the microcomputer 112 determines whether the preset zoom operation has been executed or not, by a preset flag which is to be described later. If the preset zoom operation has already been executed, the processing proceeds to S304. If the preset zoom operation has not been executed yet, the processing proceeds to S302, and it is determined whether the preset execution switch 202 has been operated or not.

In a case where the preset execution switch 202 is not operated, the processing (S300) is ended and after a predetermined period of time, the processing of S300 is started again.

In a case where it is determined in S302 that the preset zoom operation is being executed, the preset flag is changed to TRUE to show that the preset zoom operation is currently being executed. Then, the processing proceeds to the next processing, S304.

In S304, the microcomputer 112 determines whether the zoom operation is being performed in a zoom operation portion 118 or not. In a case where the zoom operation is being performed, in order to give priority to the zoom operation performed by a user in relation to the preset zoom operation, the preset flag is set to FALSE in S305 and the processing (S300) is ended.

In a case where no zoom operation is being performed in S304, the processing proceeds to S306. In S306, it is determined whether the present zoom position is in the digital zoom region or not by checking the digital-zoom use flag. If the present zoom position is in the digital zoom region, the processing of proceeds to S314. If the present zoom position is not in the digital zoom region (that is, in the optical-zoom region), the processing of proceeds to S307.

In S307, it is determined whether the preset position is located in the optical-zoom region or not. If the preset position is located within the digital zoom region, the processing proceeds to S311. On the other hand, if the preset position is located within the optical-zoom region, the processing proceeds to S308. In S308, the preset position and the present zoom position are compared to each other, and if the preset position is closer to the tele-photo end than the present zoom position, the optical-zoom toward the tele-photo direction is carried out by an operation of the zoom lens driving portion 115 and the focus lens driving portion 116 in conjunction with each other. In addition, if the preset position is closer to the wide-angle end than the present zoom position, the optical-zoom toward the wide-angle direction is carried out in the same way. At this time, the zoom operation is performed at a substantially constant zooming speed (that is, at a constant magnification changing ratio) which is set by the speed selection volume 203. In addition, in a case where the speed selection volume 203 is not provided, the zoom operation may be carried out at a prescribed zooming speed.

In S309, the preset position and the present optical-zoom position are compared to each other. If the positions are identical to a same value, the preset flag is set to FALSE in S310, the zoom operation is stopped, and the processing (S300) is ended.

On the other hand, in S311, the optical-zoom operation toward the tele-photo direction is carried out to determine in S312 whether the optical-zoom position has reached an optical tele-photo end (a marginal position of the optical-zoom) or not. If the optical-zoom position has not reached the optical tele-photo end, the processing (S300) is temporarily ended to wait until the start time of the next processing (S300). If the optical-zoom position has reached the optical tele-photo end, the processing proceeds to S313. In S313, the digital-zoom use flag is changed to TRUE, and the processing proceeds to the digital-zoom operation in S318.

In S314, it is determined whether the preset position is in the digital zoom region or not. If the preset position is located in the digital zoom region, the processing proceeds to S318. If the preset position is not located in the digital zoom region, the processing proceeds to S315. In S318, the digital-zoom is performed at the zooming speed which is set by the speed selection volume 203 toward the preset position. Then, in S319, it is determined whether the preset position and the present zoom position (digital-zoom position) have become identical to each other or not. If the positions are identical to each other, the digital-zoom operation is stopped in S320, the preset flag is set to FALSE, and the processing (S300) is ended.

On the other hand, in S315, the digital-zoom toward the wide-angle direction is carried out at the zooming speed which is set by the speed selection volume 203. Then, in S316, it is determined whether the digital-zoom position has reached the digital wide-angle end. If the digital-zoom position has not reached the digital wide-angle end, S316 is carried out again in the next routine and the digital-zoom toward the wide-angle direction is performed until the digital-zoom position reaches the digital wide-angle end.

In addition, if the digital-zoom position has reached the digital wide-angle end, the processing proceeds to S317. In S317, the digital-zoom use flag is set to FALSE, the digital-zoom operation is stopped, and then the processing proceeds to S308 to carry out the optical-zoom to the wide-angle end up to the preset position.

By repeatedly carrying out the processing (S300) as explained above at regular time intervals, it becomes possible to carry out the preset zoom operation across the digital-zoom and the optical-zoom, namely the preset zooming from the present zoom position in one of the optical-zoom region and the digital zoom region to the preset position in the other region.

Figures 3, 3A:
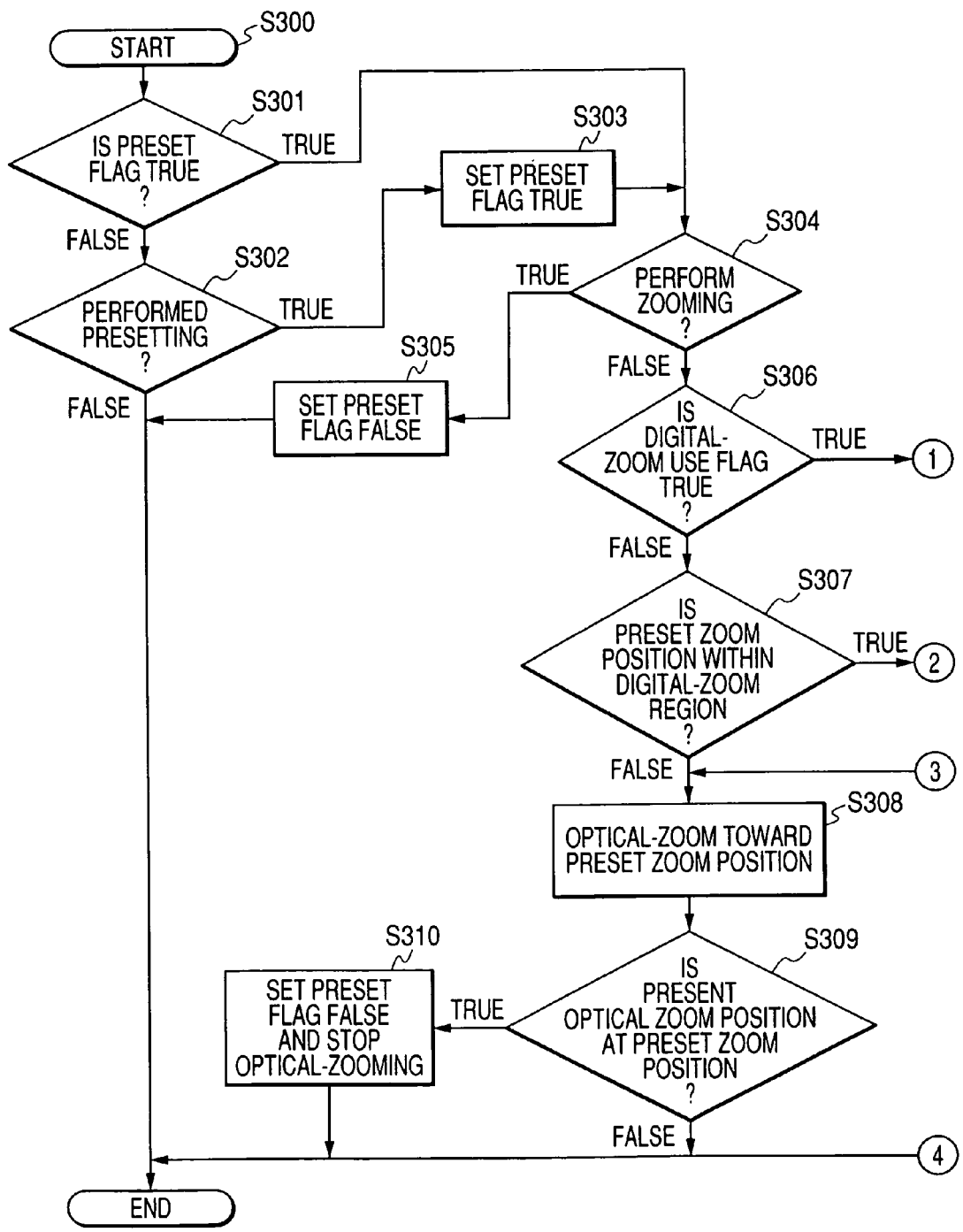
FIG. 3 is comprised of FIGS. 3A and 3B showing flow charts explaining a processing of the preset zoom operation according to the first embodiment of the present invention.
Figure 3B:
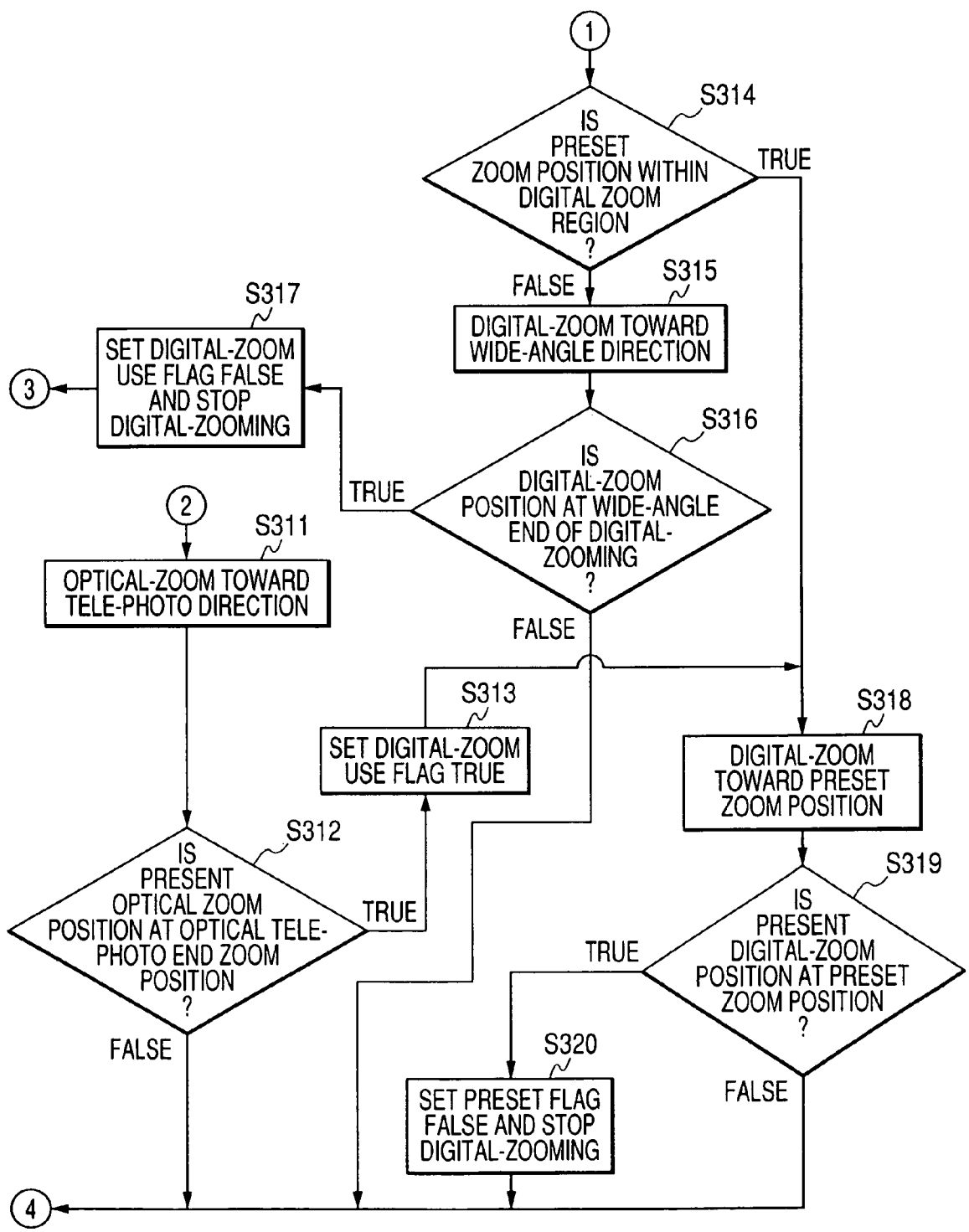

For example, as shown in FIG. 5A, in a case where the present zooming position is located in the optical-zoom region, as indicated by rhombus symbol, and where the preset position is located in the digital zoom region, as indicated by circular symbol, when the preset execution switch 202 is operated, in FIGS. 3A and 3B, the processing proceeds in the order of S302→S303→S304→S306→S307→S311→S312→END. In this case, in the optical-zoom region, a series of the processings of S301→S304→S306→S307→S311→S312→END are repeated to perform the optical-zoom operation, and at the shift from the optical-zoom region to the digital zoom region, the processing proceeds in the order of S301→S304→S306→S307→S311→S312→S313→S318→S319→END. Upon the shift, the microcomputer 112 controls the optical-zooming speed and the digital-zooming speed so that the virtual zooming speed is maintained at the zooming speed which is set by the speed selection volume 203. Thereby a photographer never feels uncomfortable when the zooming region is shifted. This also applies to other embodiments which are to be described later.

In addition, after the zoom position has shifted to the digital zoom region, a series of the processings of S301→S304→S306→S314→S318→S319→END are repeated, and finally, the processing proceeds in the order of S301→S304→S306→S314→S318→S319→S320→END, and the preset zoom operation is ended.

The change in the preset zoom operation between the optical-zoom position and the digital-zoom position is as indicated by reference numerals 502 and 503 in FIGS. 5A and 5B.

Figure 6A:
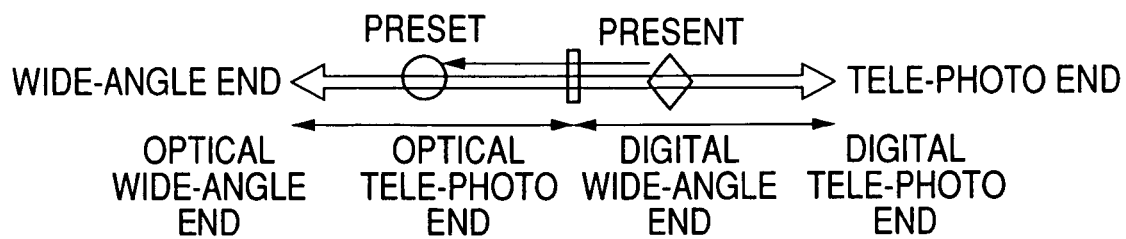
FIGS. 6A and 6B are diagrams explaining a preset zoom operation from the digital zoom region to the optical-zoom region according to the first embodiment of the present invention.

In addition, as shown in FIG. 6A, in a case where the present zooming position is within the digital zoom region, as indicated by rhombus symbol, and where the preset position is within the optical-zoom region, as indicated by circular symbol, when the preset execution switch 202 is operated, in FIGS. 3A and 3B, the processing proceeds in the order of S302→S303→S304→S306→S314→S315→S316→END. In this case, in the digital zoom region, a series of the processings of S301→S303→S304→S306→S314→S315→S316→END are repeated, and upon the shift from the digital zoom region to the optical-zoom region, the processing proceeds in the order of S301→S303→S304→S306→S314→S315→S316→S317→S318→S309→END. In response to the shift, the microcomputer 112 controls the digital-zooming speed and the optical-zooming speed so that the virtual zooming speed is maintained at the zooming speed which is set by the speed selection volume 203. This also applies to other embodiments which are to be described later.

In addition, after the zoom position has shifted to the optical-zoom region, a series of the processings of S301→S303→S304→S306→S307→S308→S309→END are repeated, and finally, the processing proceeds in the order of S301→S303→S304→S306→S307→S308→S309→S310→END, and the preset zoom operation is ended.

Figure 6B:
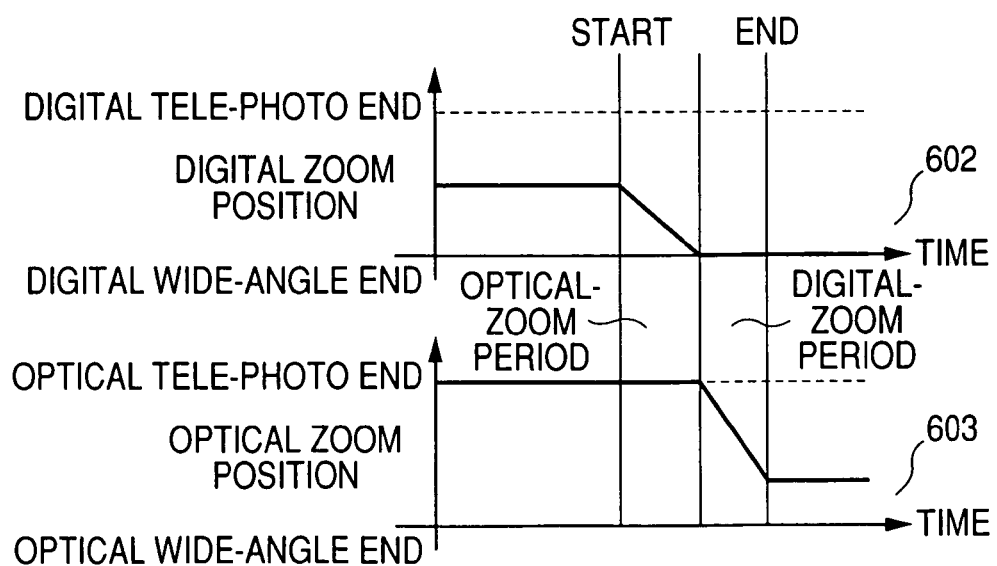

The change of the optical-zoom position and the digital-zoom position in the preset zoom operation is as indicated by reference numerals 602 and 603 in FIG. 6B.

Through the control as described above, it becomes possible to carry out the preset zoom operation across the optical-zoom region and the digital zoom region.

Figure 8:
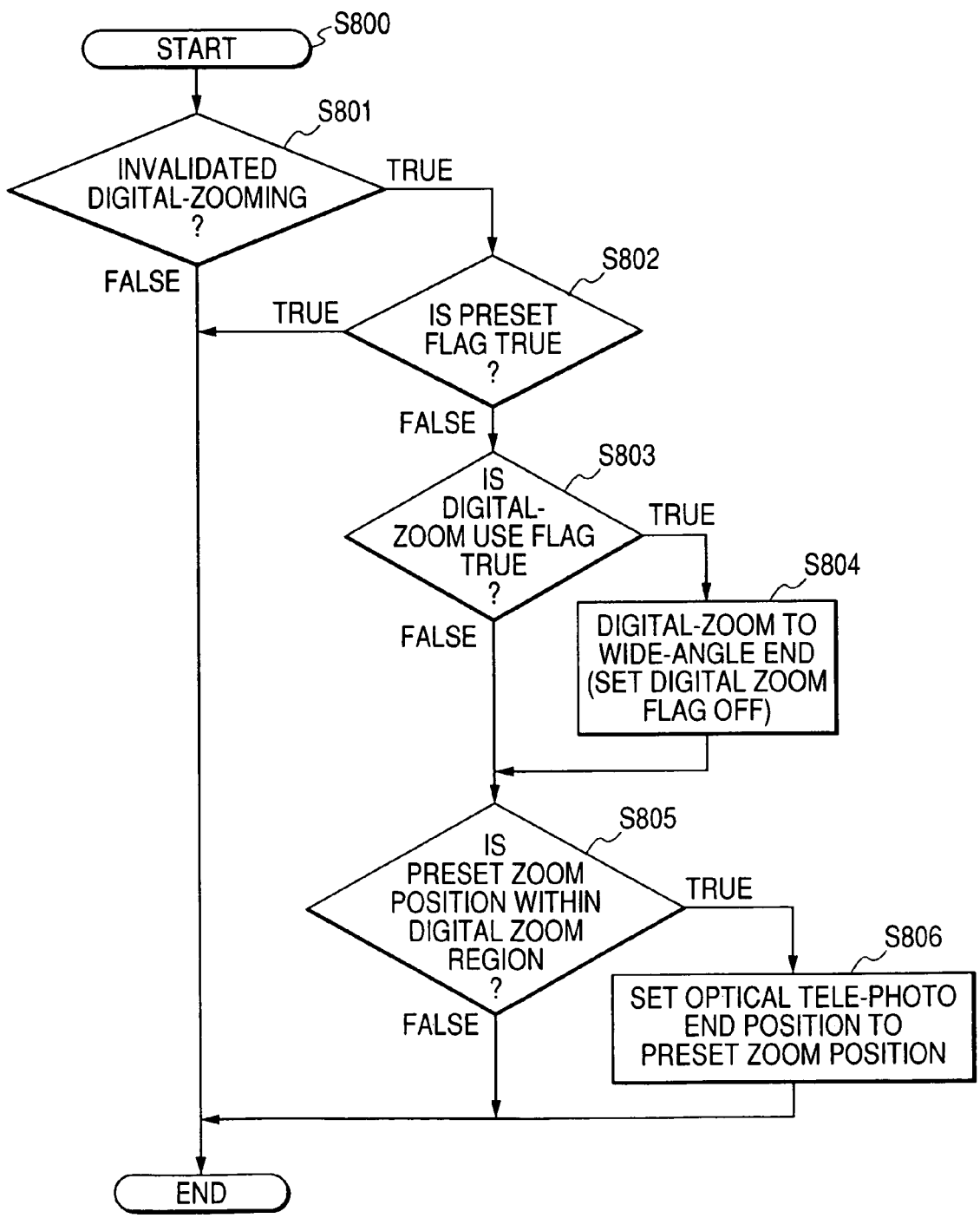
FIG. 8 is a flow chart explaining a digital-zooming invalidation processing according to the first embodiment of the present invention.

Here, the processing (S800) by the microcomputer 112 in a case where a switch (not shown) which is capable of invalidating the digital-zooming function is added will now be explained with reference to FIG. 8.

First, in S801, the microcomputer 112 determines whether an operation of the switch for invalidating the digital-zoom has been performed or not. If the operation of the switch has been performed, the processing proceeds to S802. In S802, it is determined whether the preset zoom operation is currently being executed or not. If the preset zoom operation is currently being executed, the operation of invalidating the digital-zooming itself is invalidated. In addition, if the preset zoom operation is not being executed, the processing proceeds to S803. In S803, it is determined whether the present zoom position is located in the digital zoom region or not, by checking the digital-zoom use flag. If the present zoom position is located in the digital zoom region, the digital-zoom position is immediately changed to the digital wide-angle end in S804. Here, the zoom operation by the digital-zoom is not performed. That is, the digital-zoom is set OFF and the digital-zoom magnification is set to 1.

Then, the processing proceeds to S805. In S805, it is determined whether the preset position is located in the digital zoom region or not. If the preset position is located in the digital zoom region, the processing proceeds to S806 to change the preset position to the optical tele-photo end. In other words, the zoom position stored in the zoom position memory 201 is rewritten into the optical tele-photo end. Thereby in a case where the digital-zoom is prohibited, when the preset position is in the digital zoom region, the zoom state is changed to the optical tele-photo end (digital wide-angle end).

Figure 7A:
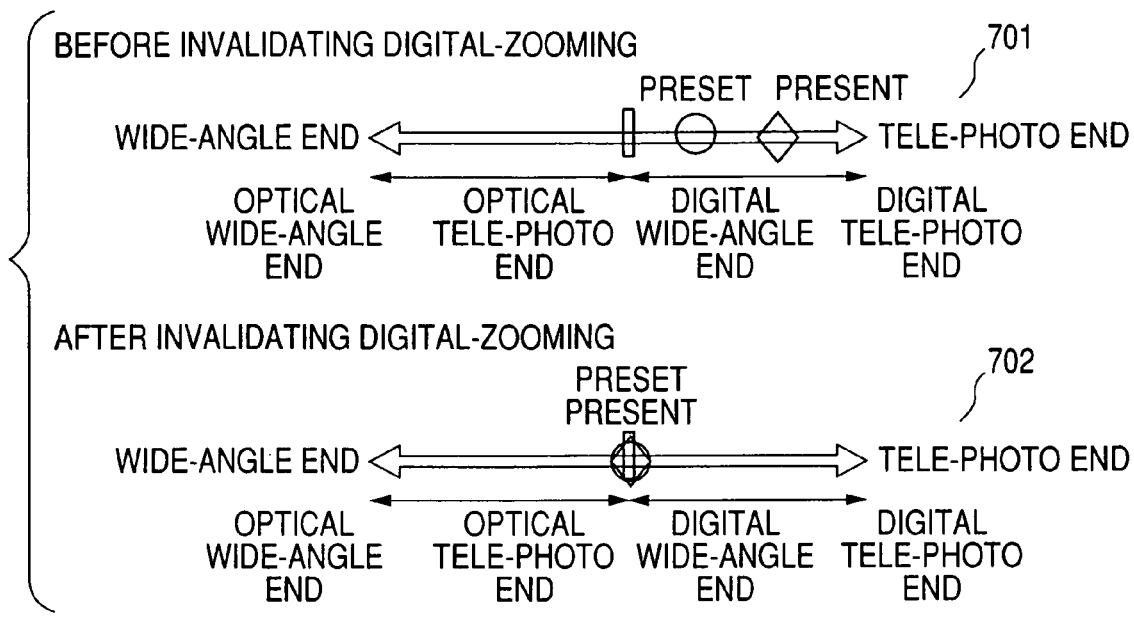
FIGS. 7A and 7B are diagrams explaining an operation of a digital-zooming invalidation processing according to the first embodiment of the present invention.
Figure 7B:
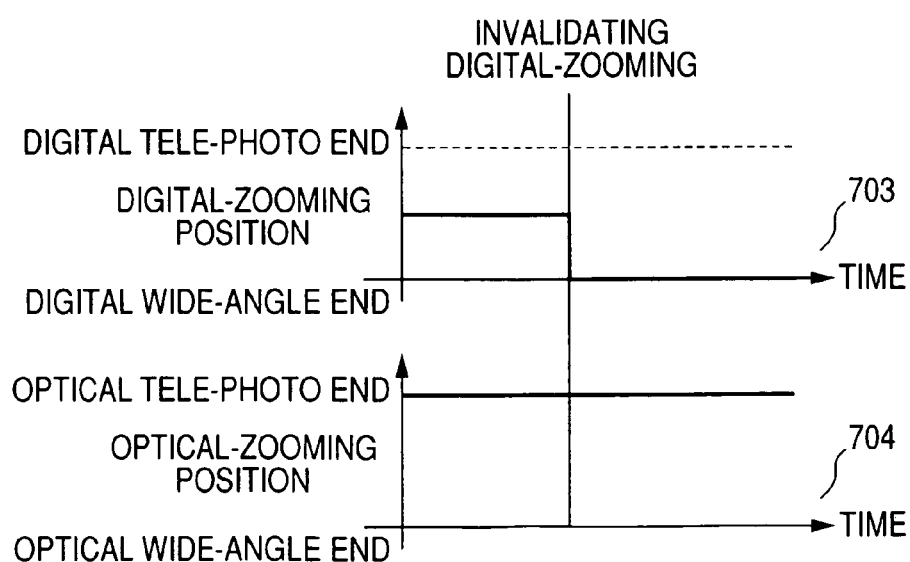

For example, as indicated by reference numeral 701 in FIG. 7A, in a case where both the present zoom position (indicated by a rhombus) and the preset position are located in the digital zoom region, when the invalidation operation of the digital-zoom is performed, the processing proceeds in the order of S801→S802→S803→S804→S805→S806, and comes to a state as indicated by reference numeral 702 in FIG. 7A. The change with time in the digital-zoom position and the optical-zoom position at this time is indicated by reference numerals 703 and 704.

Note that the digital-zooming invalidation processing can be adopted as well for other embodiments to be described later.

Second Embodiment

Next, as a second embodiment of the present invention, explanation will now be made as to a lens-incorporated video camera which is capable of performing a shuttle shot zoom operation across the optical-zoom region and the digital zoom region. The shuttle shot zoom operation (function) is one of memory zoom functions as a zoom auxiliary function. The shuttle shot zoom function is used for the zoom operation to the preset position which is stored in advance, as in the preset zoom operation. Also, the shuttle shot zoom function is used for storing the start position of the zoom operation at this time (an original zoom position), reversing a direction of the zoom operation after or in the middle of the zoom operation to the preset position mentioned above to return the position to the original zoom position.

Accordingly, one more zoom position to be stored is added, compared to the preset zoom operation as explained in the first embodiment. In addition, two operations, namely an operation for starting the zoom operation to the preset position and an operation for starting a returning operation to the original zoom position (or an operation for canceling the zoom operation to the preset position) are necessary. In this embodiment, the two operations mentioned above correspond to an ON operation and the canceling the ON operation (an OFF operation) of one operation member (a shuttle shot execution switch). The other constitutions are the same as those of the first embodiment. Accordingly, the explanation as to the same constitutions is omitted.

Figure 10:
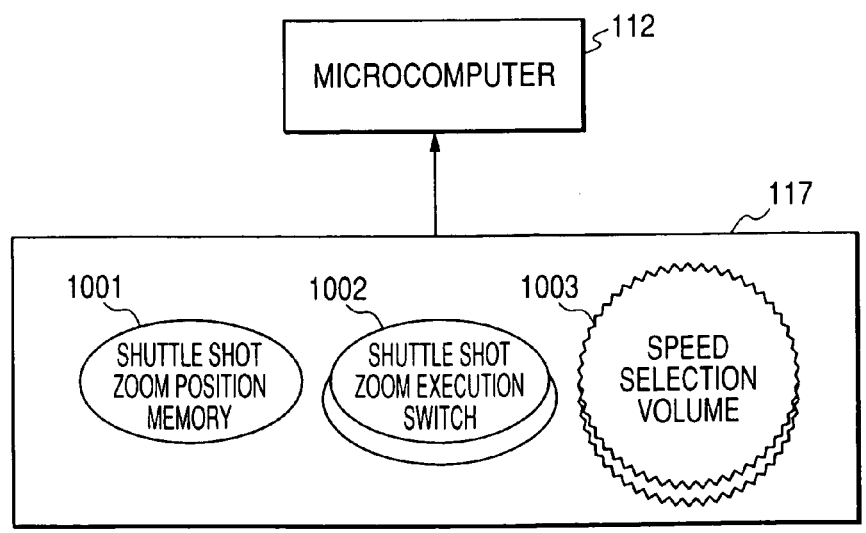
FIG. 10 is a diagram showing a constitution of a shuttle shot zoom operation portion according to a second embodiment of the present invention.

FIG. 10 shows a constitution of a shuttle shot zoom operation portion 117' of this embodiment which includes a shuttle shot execution switch 1002. A shuttle shot zoom position memory 1001 stores the preset position and the original zoom position (hereafter referred to as a cancellation position). The shuttle shot execution switch 1002 is constituted by a push-in type switch. The shuttle shot execution switch 1002 executes the zoom operation to the preset position (hereafter referred to as an outward preset zoom operation) while being pushed in. Then, when the pushed-in state is released, the zoom operation to the cancellation position (hereafter referred to as a cancellation zoom operation) is executed. A speed selection volume 1003 is used by a user to select the zooming speed during the shuttle shot zoom operation, just as in the first embodiment.

Figures 11, 11A:
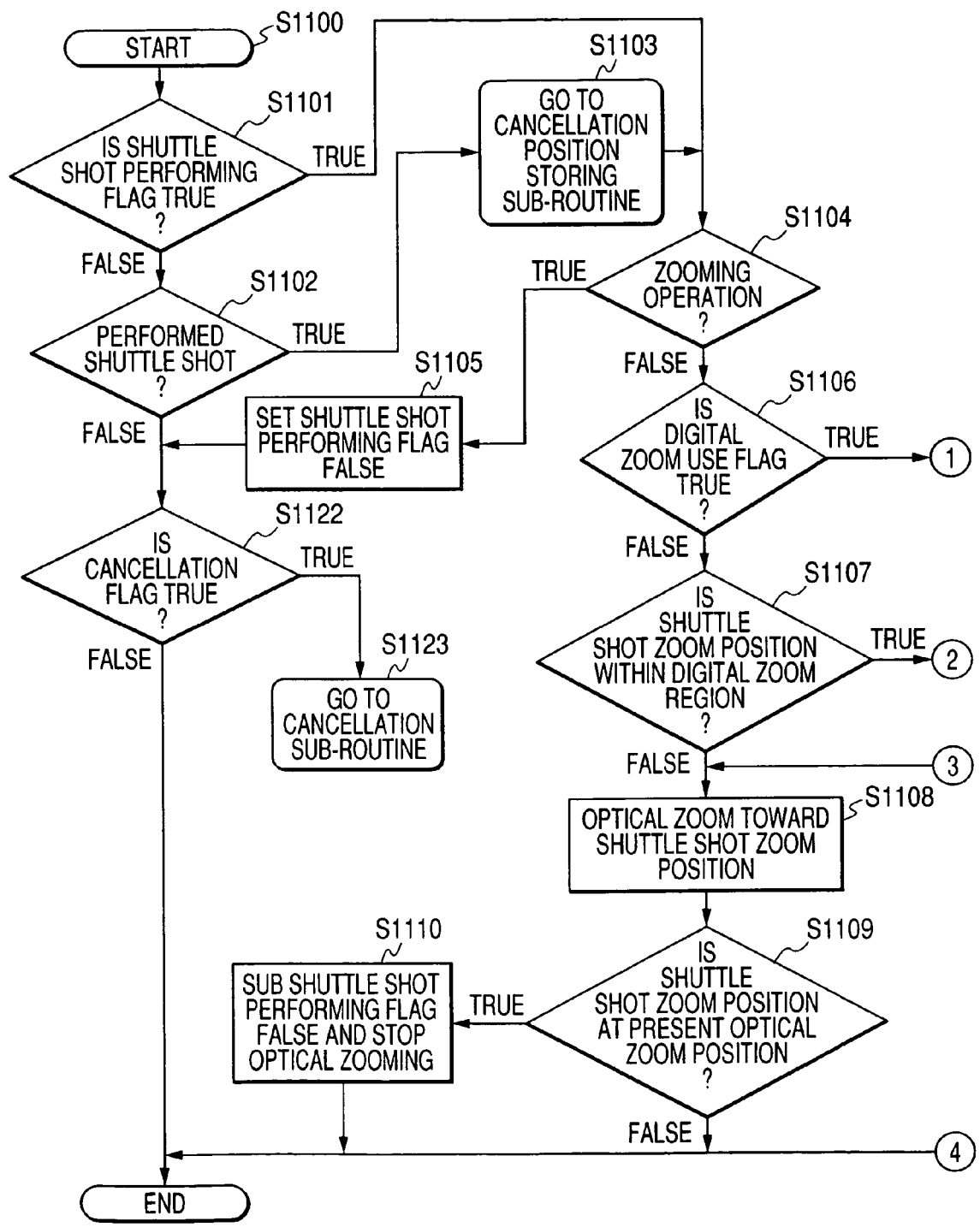
FIG. 11 is comprised of FIGS. 11A and 11B showing flow charts explaining a processing of the shuttle shot zoom operation according to the second embodiment of the present invention.
Figure 11B:
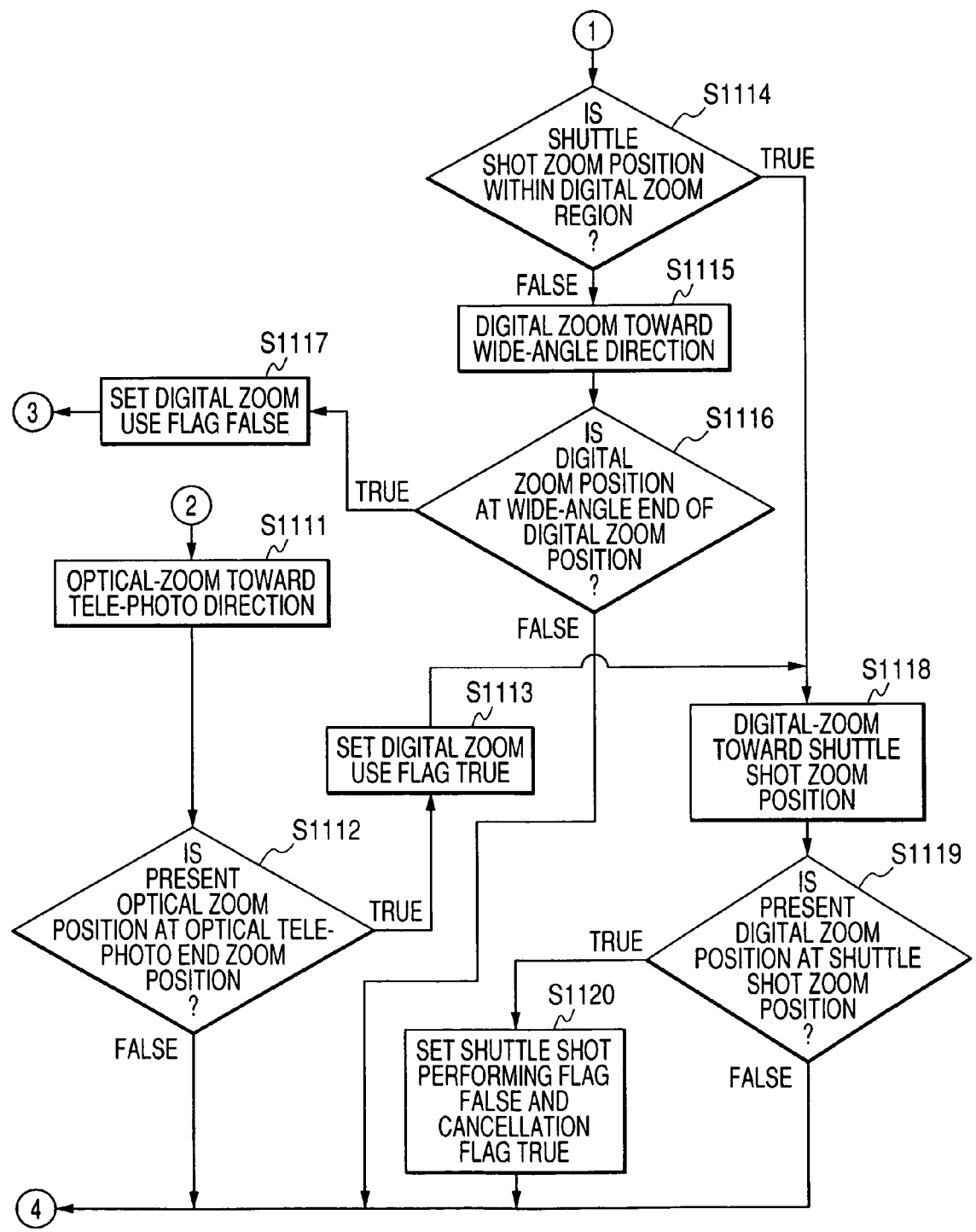

Next, a control of the shuttle shot zoom operation in this embodiment will be explained. FIGS. 11A and 11B are flow charts of the operation of the microcomputer 112, which carries out the control.

First, in S1101, the microcomputer 112 determines whether the shuttle shot zoom operation is being executed, by checking a shuttle shot performing flag which is to be described later. If the shuttle shot zoom operation has already been executed, the processing proceeds to S1104. If the shuttle shot zoom operation has not been executed, the processing proceeds to S1102. In S1102, it is determined whether the shuttle shot execution switch 1003 is operated (set ON) or not. If the shuttle shot execution switch 1003 is not operated, it is determined in S1122 whether a cancellation flag is TRUE or not. If the cancellation flag is TRUE, the processing proceeds to a subroutine of the cancellation zoom operation of S1123 which is to be described later. If the cancellation flag is not TRUE, S1100, which is a shuttle shot execution routine, is ended, and the processing of S1100 is started again after a predetermined period of time.

Figure 13:
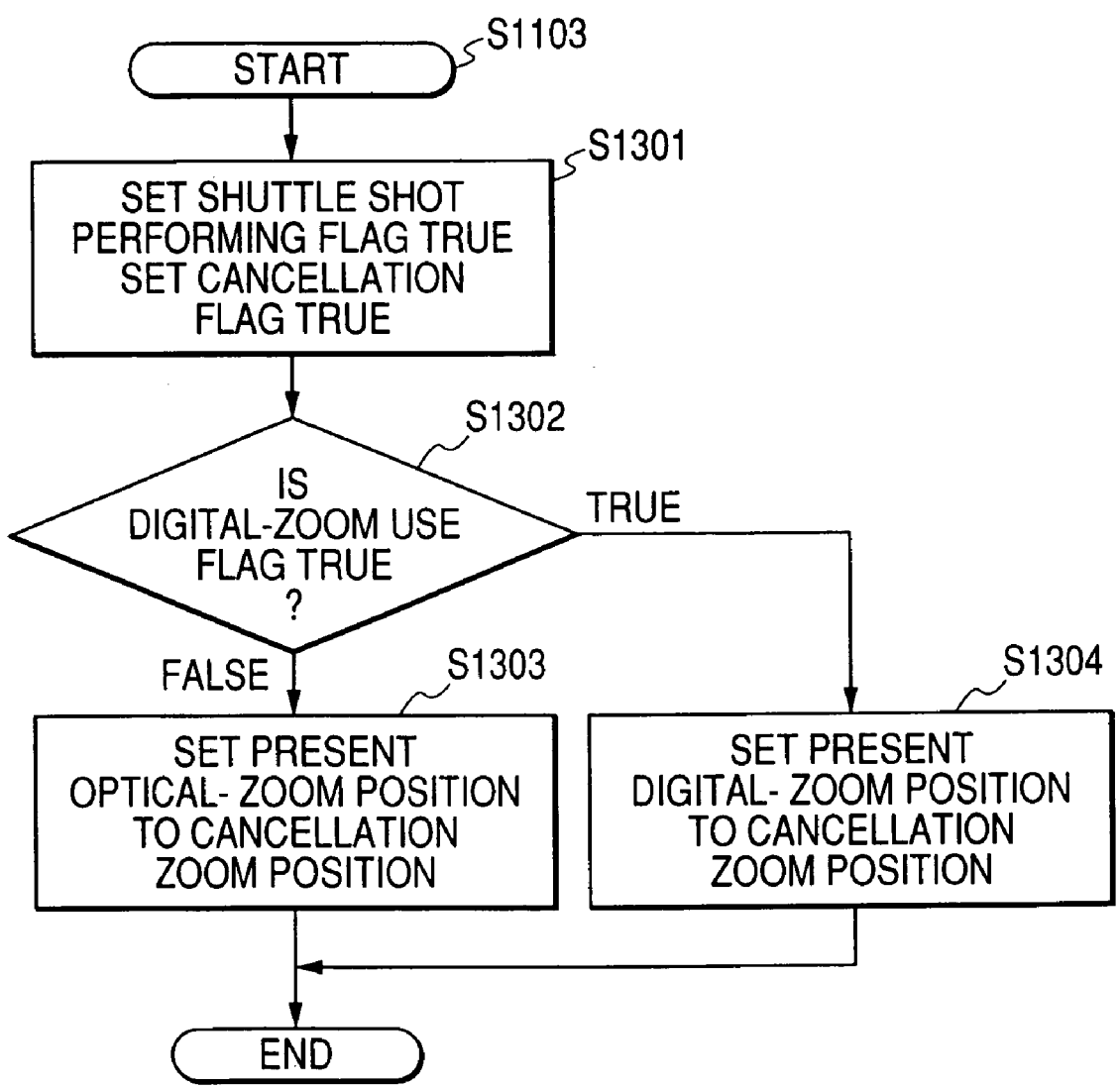
FIG. 13 is a flow chart explaining a processing of the shuttle shot zoom operation according to the second embodiment of the present invention.

In a case where it is determined in S1102 that the shuttle shot zoom operation is being executed, the processing proceeds to a subroutine S1103 that is an initialization processing at the time when the shuttle shot zooming is started. A content of the processing is shown in FIG. 13.

First, in S1301, the shuttle shot performing flag is changed to TRUE to show that the shuttle shot zoom operation is currently being executed. In addition, in order to carry out the cancellation zoom operation when the shuttle shot execution switch 1002 shifts from an ON state to an OFF state (hereafter referred to as cancelled), the cancellation flag is set TRUE.

Then, in the next step, S1302, it is determined whether the digital-zoom is being in execution, by means of the digital-zoom use flag, which is also explained in the first embodiment. In a case where the digital-zoom is being in execution, in S1304, the present digital-zoom position is stored in the shuttle shot position memory 1001, as the cancellation position which is a target zooming position at the time of canceling. In addition, in a case where the digital-zoom is not being in execution, the present optical position is stored in the shuttle shot position memory 1001 as the cancellation position. Then, the initialization processing (S1103) is ended and the processing proceeds to S1104 in FIGS. 11A and 11B.

In S1104, the microcomputer 112 determines whether the zoom operation is being performed in a zoom operation portion 118 or not. If the zoom operation is being performed, in order to give priority to the zoom operation performed by a user in relation to the shuttle shot zoom operation, and the processing proceeds to S1105 to set the shuttle shot performing flag to FALSE and set the cancellation flag to FALSE as well, thereby ending the processing (S1100).

If it is determined that no zoom operation is being performed in S1104, the processing proceeds to S1106. In S1106, it is determined whether the present zoom position is in the digital zoom region or not by means of the digital-zoom use flag. If the present zoom position is in the digital zoom region, the processing proceeds to S1114. If the present zoom position is not in the digital zoom region but in the optical-zoom region, the processing proceeds to S1107.

In S1107, it is determined whether the preset position stored in the shuttle shot position memory 1001 is located in the digital zoom region or not. If the preset position is located in the digital zoom region, the processing proceeds to S1111. On the other hand, if the preset position is located in the optical-zooming region, the processing proceeds to S1108. In S1108, the preset position and the present zoom position are compared to each other. If the preset position is closer to the tele-photo end than the present zoom position, the zoom operation is carried out toward the tele-photo direction by an operation of the zoom lens driving portion 115 and the focus lens driving portion 116. In addition, if the preset position is closer to the wide-angle end than the present zoom position, in the same way, the optical-zoom operation is carried out toward the wide-angle direction. At this time, the zoom operation is carried out at the zooming speed which has been set by the speed selection volume 1003.

Next, in S1109, comparing the preset position and the present optical-zoom position to each other, if the positions are identical to a same value, the shuttle shot performing flag is set to FALSE in S1110. In addition, the zoom operation is stopped and the outward preset zoom operation is completed.

In S1111, the optical-zoom operation toward the tele-photo direction is performed and it is determined in S1112 whether the optical tele-photo end (a marginal position of the optical-zoom) and the present zoom position are located at a same position. If they are located at different positions, the processing (S1109) is temporarily ended. If the optical tele-photo end and the present zoom position are located at a same position, the processing proceeds to S1113. In S1113, the digital-zoom use flag is changed to TRUE, and then the processing proceeds to the digital-zoom operation.

In S1114, it is determined whether the preset position is in the digital zoom region or not. If the preset position is located in the digital zoom region, the processing proceeds to S1118. If the preset position is not located in the digital zoom region (but in the optical-zoom region), the processing proceeds to S1115.

In S1118, the digital-zoom is performed at the zooming speed which is set by the speed selection volume 1003 toward the preset position. Then, in S1119, it is determined whether the preset position and the present zoom position have become identical to each other or not. If the positions are identical to each other, the digital-zoom operation is stopped in S1120, and the shuttle shot performing flag is set to FALSE. The cancellation flag is set to TRUE, thereby completing the preset zoom operation in the shuttle shot zoom operation.

In S1115, the digital-zoom operation toward the wide-angle direction is carried out at a substantially constant zooming speed which has been set by the speed selection volume 1003. Then, in S1116, it is determined whether the present digital-zoom position has reached the digital wide-angle end or not. If the present digital-zoom position has not reached the digital wide-angle end yet, the digital-zoom toward the wide-angle direction is carried out until it is determined in S1116 on and after the next routine that the digital-zoom position has reached the digital wide-angle end. On the other hand, if the digital-zoom position has reached the digital wide-angle end, the processing proceeds to S1117. In S1117, the digital-zoom use flag is set to FALSE and the digital-zoom operation is stopped. Then, the processing proceeds further to S1108 and the optical-zoom operation toward the wide-angle direction is carried out.

Figures 12, 12A:
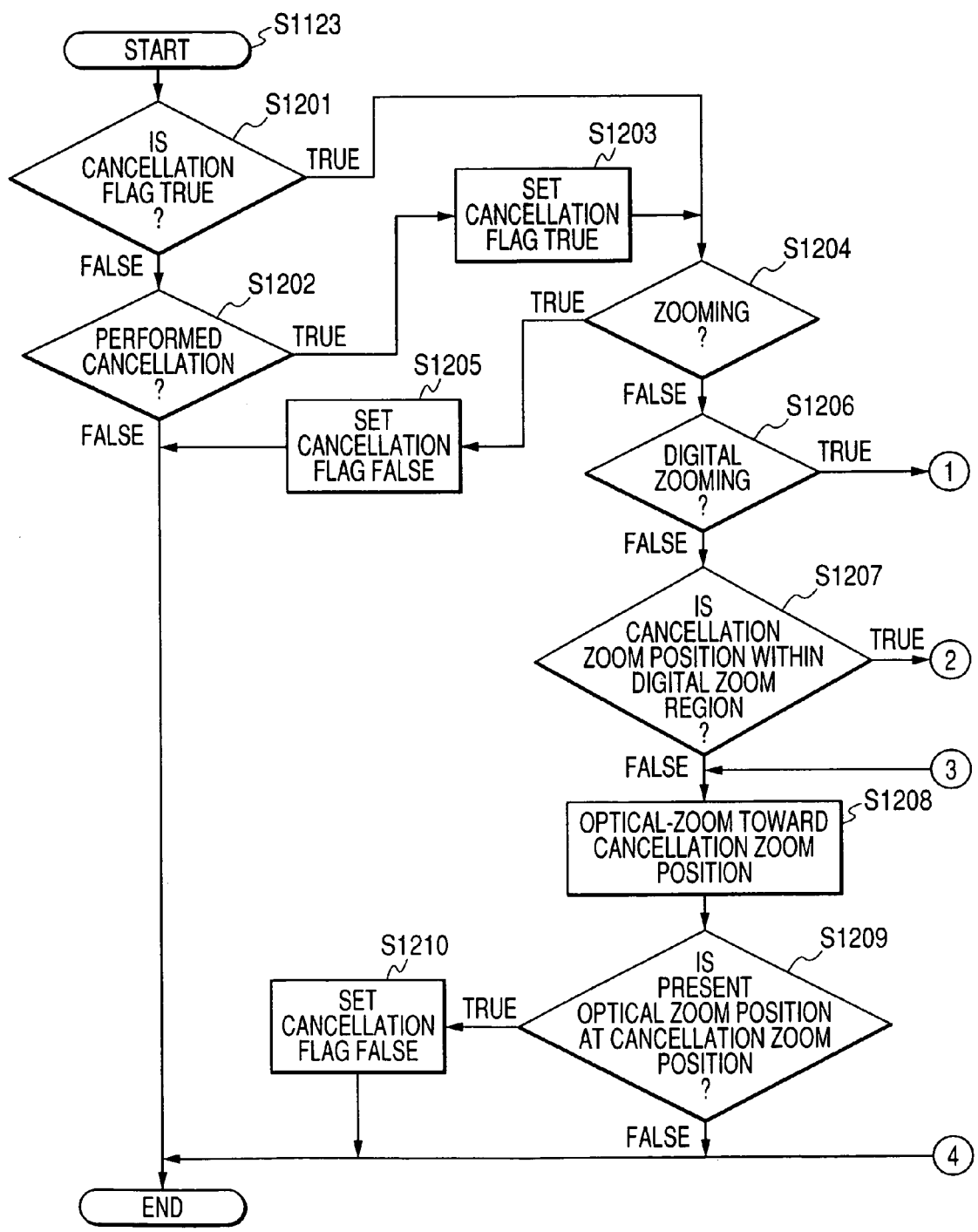
FIG. 12 is comprised of FIGS. 12A and 12B showing flow charts explaining a processing of the shuttle shot zoom operation according to the second embodiment of the present invention.
Figure 12B:
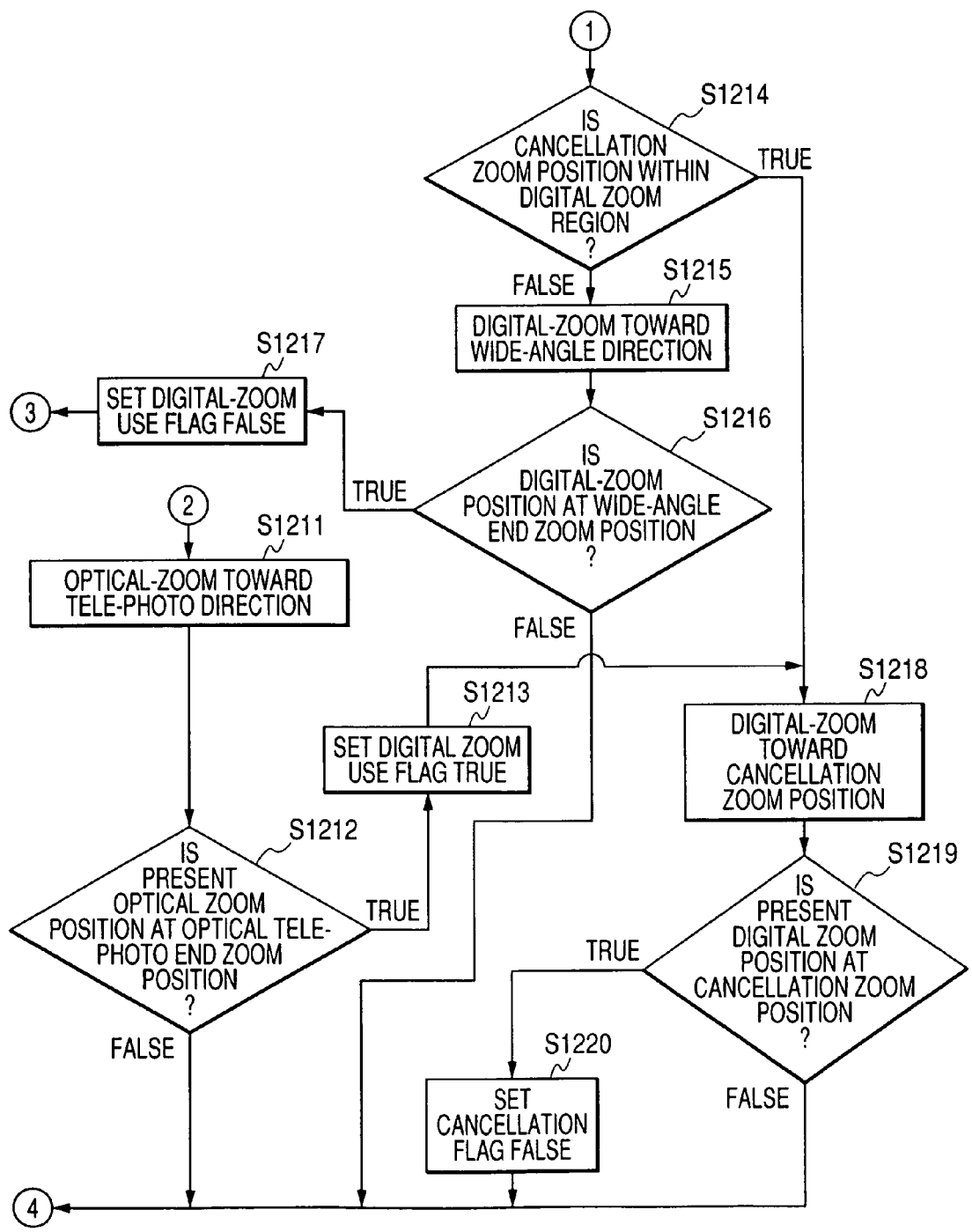

The cancellation zoom operation is carried out in accordance with a flow chart as shown in FIGS. 12A and 12B. First, in S1201, the microcomputer 112 determines whether the cancellation zoom operation has been executed or not, by a cancellation flag which is to be described later. If the cancellation zoom operation has already been executed, the processing proceeds to S1204. If the cancellation zoom operation has not been executed yet, the processing proceeds to S1202, and it is determined whether the canceling operation (cancellation execution operation) of the preset execution switch 1202 has been performed or not.

In a case where the cancellation execution operation is not operated, the processing (S1123) is ended and after a predetermined period of time, the processing of S1123 is started again.

If it is determined in S1201 that the cancellation zoom operation is being executed, the cancellation flag is changed to TRUE to show that the cancellation zoom operation is currently being executed. Then, the processing proceeds to the next process, S1204.

In S1204, the microcomputer 112 determines whether the zoom operation is being performed in a zoom operation portion 118 or not. If the zoom operation is being performed, in order to give priority to the zoom operation performed by a user in relation to the cancellation zoom operation, the preset flag is set to FALSE in S1205 and the processing (S1123) is ended.

If no zoom operation is being performed in S1204, the processing proceeds to S1206. In S1206, it is determined whether the present zoom position is in the digital zoom region or not by checking the digital-zoom use flag. If the present zoom position is in the digital zoom region, the processing proceeds to S1214. If the present zoom position is not in the digital zoom region, the processing proceeds to S1207.

In S1207, it is determined whether the cancellation position is located in the optical-zoom region or not. If the cancellation position is located within the digital zoom region, the processing proceeds to S1211. On the other hand, if the preset position is located within the optical-zoom region, the processing proceeds to S1208. In S1208, the cancellation position and the present zoom position are compared to each other, and if the cancellation position is more tele-photo side than the present zoom position, the optical-zoom toward the tele-photo direction is carried out through an operation of the zoom lens driving portion 115 and the focus lens driving portion 116 in conjunction with each other. In addition, if the cancellation position is more wide-angle side than the present zoom position, the optical-zoom toward the wide-angle direction is carried out in the same way. At this time, the zoom operation is performed at a substantially constant zooming speed which is set by the speed selection volume 1003. In addition, if the speed selection volume 1003 is not provided, the zoom operation may be carried out at a prescribed zooming speed.

In S1209, the cancellation position and the present optical-zoom position are compared to each other. If the positions are identical to a same value, the preset flag is set to FALSE in S1210, the zoom operation is stopped, and the processing (S1123) is ended.

On the other hand, in S1211, the optical-zoom operation toward the tele-photo direction is carried out to determine in S1212 whether the optical-zoom position has reached an optical tele-photo end (a marginal position of the optical-zoom) or not. If the optical-zoom position has not reached the optical tele-photo end, the processing (S1123) is temporarily ended to wait until the start time of the next processing (S1123). If the optical-zoom position has reached the optical tele-photo end, the processing proceeds to S1213. In S1213, the digital-zoom use flag is changed to TRUE, and the processing proceeds to the digital-zoom operation in S1218.

In S1214, it is determined whether the cancellation position is in the digital zoom region or not. If the cancellation position is located in the digital zoom region, the processing proceeds to S1218. If the preset position is not located in the digital zoom region, the processing proceeds to S1215. In S1218, the digital-zoom is performed at the zooming speed which is set by the speed selection volume 1003 toward the preset position. Then, in S1219, it is determined whether the cancellation position and the present zoom position (digital-zoom position) have become identical to each other or not. If the positions are identical to each other, the digital-zoom operation is stopped in S1220, the preset flag is set to FALSE, and the processing (S1123) is ended.

On the other hand, in S1215, the digital-zoom toward the wide-angle direction is carried out at the zooming speed which is set by the speed selection volume 1003. Then, in S1216, it is determined whether the digital-zoom position has reached the digital wide-angle end. If the digital-zoom position has not reached the digital wide-angle end, the processing of S1216 is carried out again in the next routine and the digital-zoom toward the wide-angle direction is performed until the digital-zoom position reaches the digital wide-angle end.

In addition, if the digital-zoom position has reached the digital wide-angle end, the processing proceeds to S1217. In S1217, the digital-zoom use flag is set to FALSE, the digital-zoom operation is stopped, and then the processing proceeds to S1208 to carry out the optical-zoom toward the wide-angle direction up to the preset position.

By repeating the processing (S1123) as explained above at regular time intervals, it becomes possible to carry out the shuttle shot zoom operation across the digital-zoom region and the optical-zoom region, namely the shuttle shot zoom operation from the present zoom position (cancellation position) in either one of the optical-zoom region and the digital zoom region to the preset position in the other region.

Note that the flow chart shown in FIGS. 12A and 12B are equivalent to the flow chart shown in FIGS. 3A and 3B of the first embodiment except that the term "preset" in the flow chart as shown in FIGS. 3A and 3B is replaced by the term "cancel". Accordingly, the specific flow of the processings in each of the zoom regions is the same as that explained in relation to FIGS. 3A and 3B.

In addition, in this embodiment, the explanation is made as to a case where the cancellation zoom operation is started by cancellation of the operation of the shuttle shot execution switch after the zoom position reaches the preset position. However, in a case where the operation of the shuttle shot execution switch is cancelled before the zoom position reaches the preset position (in other words, in the middle of the outward preset zoom operation), the cancellation zoom operation may be started from the zoom position.

In addition, in this embodiment, the optical-zoom region and the digital zoom region do not overlap each other, and the zoom position belongs only to either one of the optical-zoom region and the digital zoom region. However, the optical-zoom region and the digital zoom region may partially overlap each other as will be discussed below.

Third Embodiment

Figure 14:
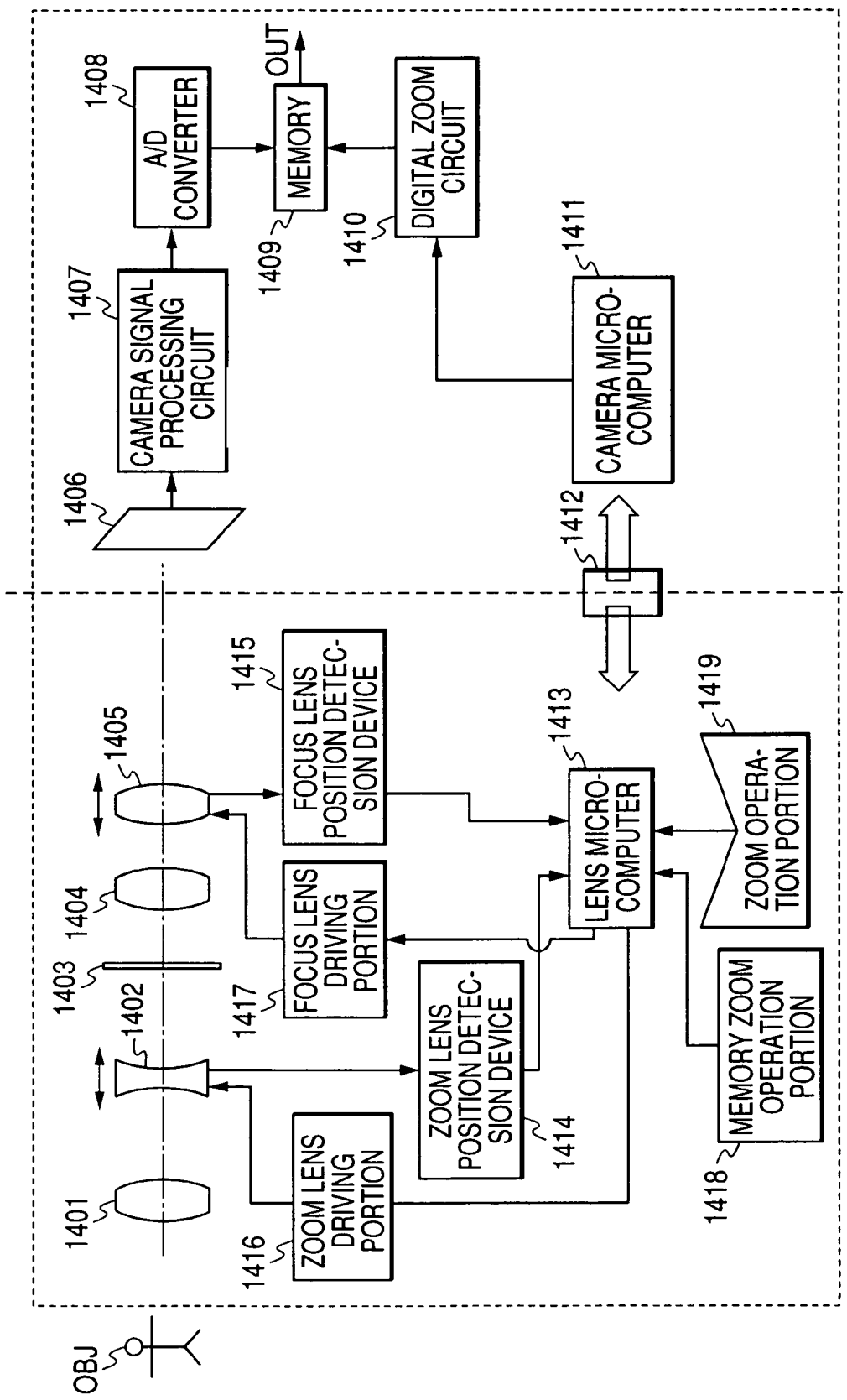
FIG. 14 is a block diagram showing a constitution of an interchangeable lens type video camera (photographing system) according to a third embodiment of the present invention.

Next, as a third embodiment of the present invention, the preset zoom operation and the shuttle shot zoom operation across the optical-zoom region and the digital zoom region in an interchangeable lens type video camera will now be explained with reference to FIG. 14.

The photography optical system of the interchangeable lens which constitutes the photographing system is a so-called rear-focus type zoom optical system. Light from an object OBJ which is incident into the optical system passes through a first lens 1401, which is fixed; a second lens (variator lens) 1402 for zooming; an iris 1403 for adjusting light quantity; a third lens 1404, which is fixed; and a fourth lens (focus lens) 1405 for focusing, and then passes through a mount portion of the interchangeable lens and the video camera body to form an image on an image pickup element 1407 such as a CCD sensor or CMOS sensor.

An electric signal generated through a photoelectric conversion operation by the image pickup element 1406 is sent to a camera signal processing circuit 1407. The electric signal is converted into an analog video signal which is subjected to a signal processing of such as signal amplification and the like. Further, the analog video signal is converted into a digital video signal by means of an A/D converter 1408. The digital video signal is sent to a memory 1409. The memory 1409 temporarily stores the video signal.

Here, a digital-zoom circuit 1410 carries out a zoom processing of the digital video signal stored in the memory 1409, on the basis of a zoom magnification signal by a camera microcomputer 1411. The digital-zoom circuit 1411, in order to obtain a zoom magnification equal to or larger than 1, things out image signals stored in the memory 1409, and carries out the zoom processing by interpolating the image signals which are thinned out, by means of various methods. By carrying out the zoom processing like this by changing a magnification smoothly in terms of time, it becomes possible to obtain a moving image which is zoomed in or zoomed out The video signal in the memory 1409 which is processed into a video image of an appropriate magnification by the digital-zoom circuit 1410 is then subjected to processings such as a color correction processing, a white balance processing, and the like. After that, the video signal is outputted to a recording medium (such as a semiconductor memory, an optical disk, or a magnetic tape) or an external device of a personal computer, a television monitor, and the like.

The lens microcomputer 1413 reads a zoom command signal outputted from a zoom operation portion 1419, which is operated in order to change an amount of zooming (magnification).

Here, an explanation will be made as to a case where the lens microcomputer 1413 carries out an optical-zoom control. In a rear focus type optical system as in this embodiment, the lens cannot be focused, by merely moving a zoom lens 1402 as explained in the first embodiment as well. Accordingly, the lens microcomputer 1413 detects the position of the zoom lens 1402 and the focus lens 1405 by means of a zoom lens position detection device 1414 and a focus lens position detection device 1415. In addition, the lens microcomputer 1413 moves the zoom lens 1402 and the focus lens 1405 via a zoom lens driving portion 1416 and a focus lens driving portion 1417 so that a lens position relationship as shown in FIG. 4 can be established when a zoom command is outputted by a zoom operation portion 1419.

In addition, provided on the lens side is a preset zoom operation portion or a shuttle shot zoom operation portion 1418, as an exclusive operation member of the preset zoom function which is one of the memory zoom functions as a zoom auxiliary function. The shuttle shot zoom operation portion 1418 has the same structure as that in the first embodiment shown in FIG. 2.

In the photographing system of this embodiment, it is possible to carry out the optical-zoom, which is performed by moving the variator lens 1402 and the focus lens 1405 in conjunction with each other, and the digital-zoom in which the zooming is performed through image processing of the video signal. More specifically, the zooming in a low magnification region is carried out by means of the optical-zoom, and the zooming based on the digital-zoom is carried out to move a lens toward the tele-photo side in a region more tele-photo side than the optical tele-photo end.

In addition, in this embodiment, the optical-zoom region and the digital zoom region do not overlap each other and the zoom position belongs only to either one of the optical-zoom region and the digital zoom region. However, in order to smoothly carry out shifting between the optical-zoom region and the digital zoom region (that is, so that no joint between the zoom regions is conspicuous), a region in which the optical-zoom region and the digital zoom region overlap each other may be provided as will be discussed below.

In addition, just as explained in the first and the second embodiments, it is possible in this embodiment also to carry out the preset zoom operation and the shuttle shot zoom operation across the optical-zoom region and the digital zoom region. The specific processings of the preset zoom operation and the shuttle shot zoom operation are basically the same as those explained in the first and the second embodiments. In this embodiment, the lens microcomputer 1413 functions as zoom control means and the camera microcomputer 1411 makes the digital-zooming circuit 1410 perform the digital-zoom in accordance with a digital-zoom command received from the lens microcomputer 1413.

Figure 15:
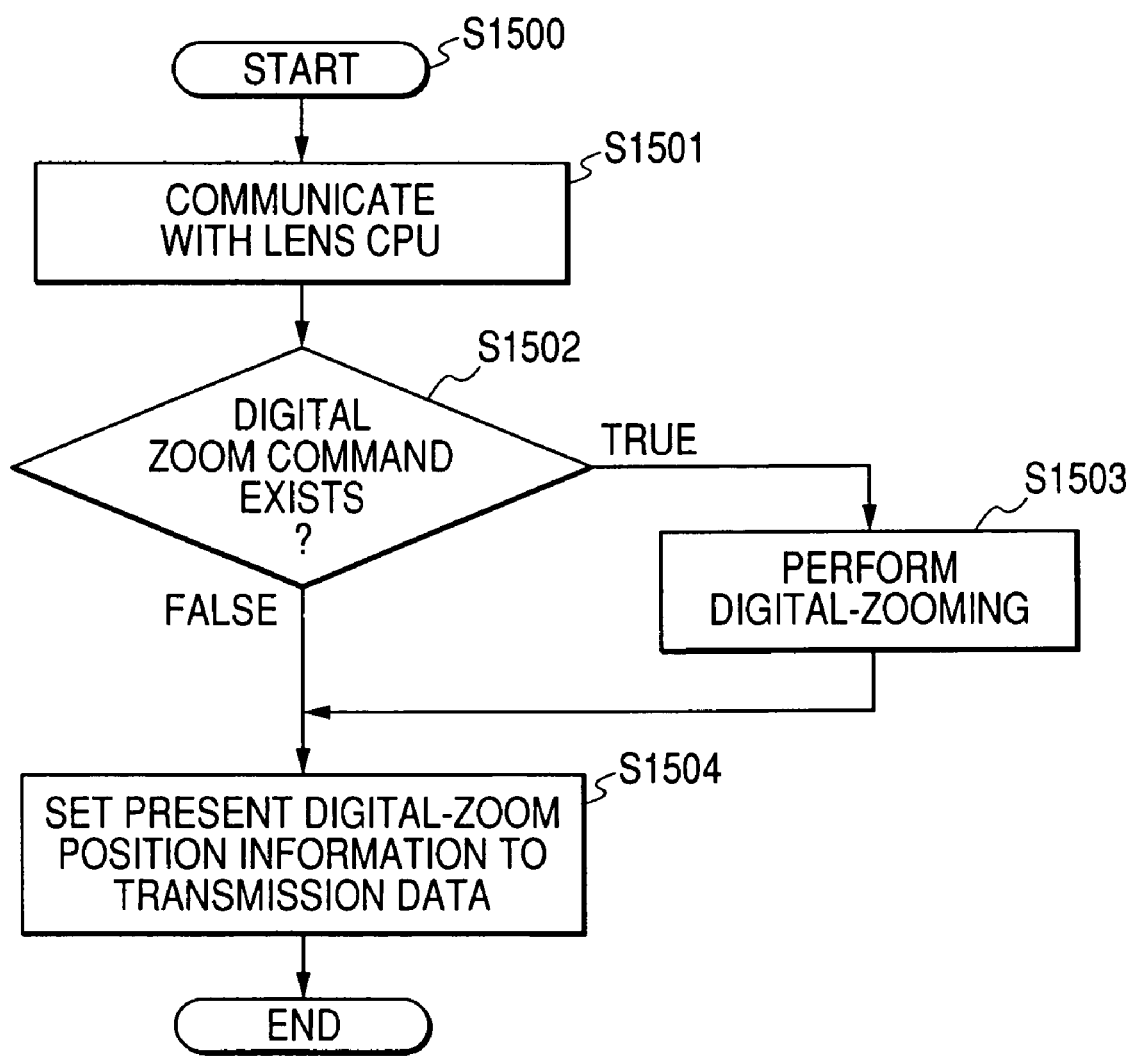
FIG. 15 is a flow chart explaining an operation of the camera microcomputer according to the third embodiment of the present invention.

Here, explanation will now be made as to a communication processing between the lens microcomputer 1413 and the camera microcomputer 1411. First, an operation flow chart of the camera microcomputer 1411 is shown in FIG. 15.

In S1501, the camera microcomputer 1411 communicates with the lens microcomputer 1413. Through this communication, the camera microcomputer 1411 receives a digital zoom command from the lens microcomputer 1413. Then, in S1502, it is determined whether the digital zoom command is received or not. If the digital zoom command is received, the digital-zoom is performed in S1503. Then, the processing proceeds to S1504.

In addition, if the digital-zoom command is not received in S1502, the processing proceeds to S1504. In S1504, for the next communication with the lens microcomputer 1413, present digital-zooming position information (information indicating the digital-zoom position such as the digital-zoom magnification) is set in transmission data. Then, the processing (S1500) is ended. The processing (S1500) is carried out at regular time intervals, and information is exchanged between the lens microcomputer 1413 and the camera microcomputer 1411.

Next, an operation flow chart of the lens microcomputer 1413 is shown in FIG. 16. In S1601, the lens microcomputer 1413 communicates with the camera microcomputer 1411. The lens microcomputer 1413 receives the digital-zooming information and the like from the camera microcomputer 1411 and sends the digital-zoom command and digital-zooming control data (data as to the zooming speed and the direction of zooming) to the camera microcomputer 1411. Then, the preset zoom operation subroutine S300 is called to carry out the processing of the preset zoom operation. In addition, on the basis of the processing, in S1602, the digital-zoom command and the control data for digital-zoom to be transmitted to the camera microcomputer 1411 in the next communication are set in the transmission data.

In addition, the shuttle shot zoom operation can be carried out by substituting the operation flow chart shown in FIG. 16 with an operation flow chart shown in FIG. 17. More specifically, S300 shown in FIG. 16 is substituted with S1100 described in the second embodiment with reference to FIGS. 11A, 11B, 12A and 12B.

As is described above, according to this embodiment, in an interchangeable lens type photographing system, it becomes possible to implement the preset zoom operation and the shuttle shot zoom operation across the optical-zoom region and the digital zoom region.

Fourth Embodiment

Figure 18:
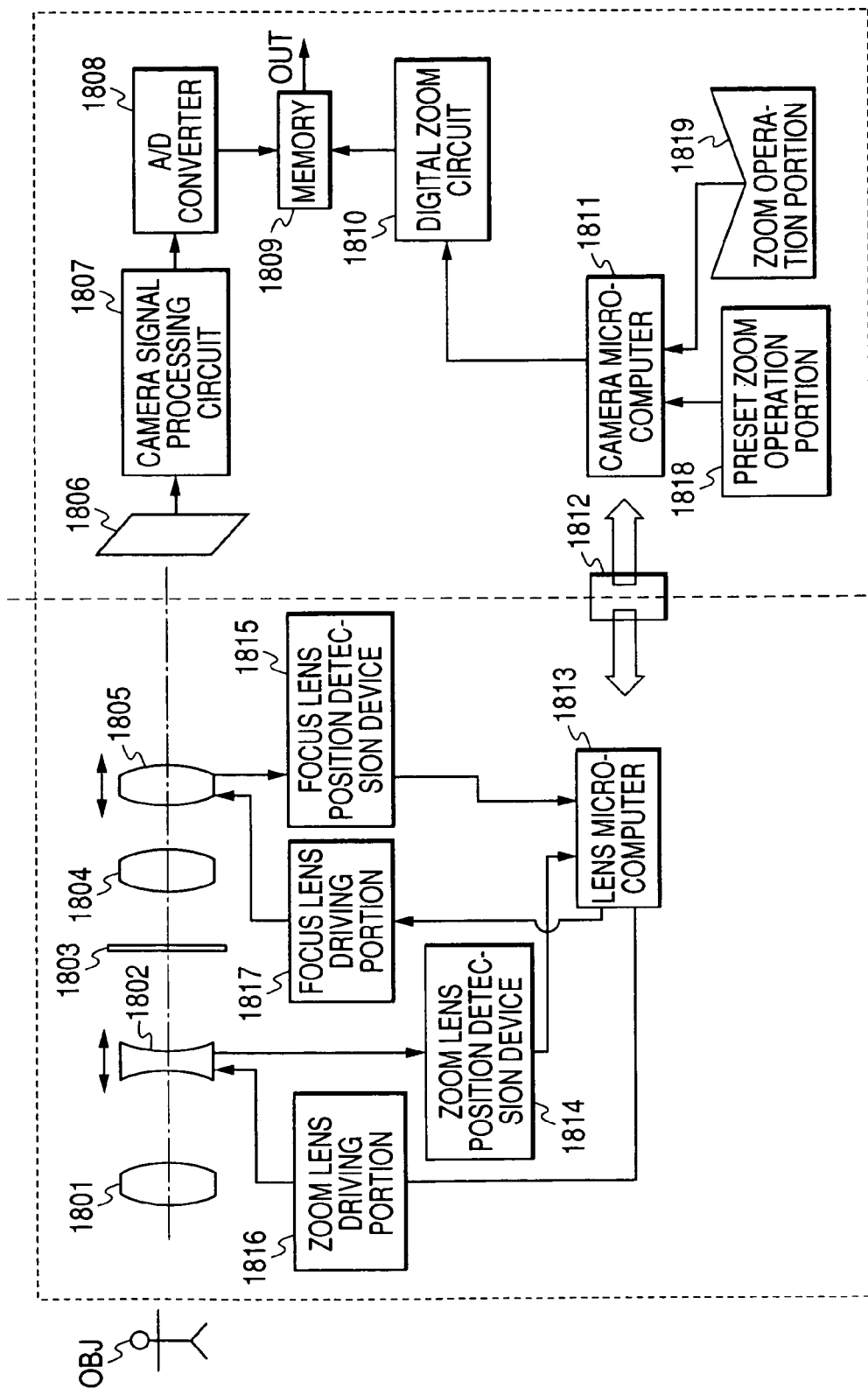
FIG. 18 is a block diagram showing a constitution of an interchangeable lens type video camera (photographing system) according to a fourth embodiment of the present invention.

In the third embodiment, explanation has been made as to a case where the preset zoom operation portion or the shuttle shot zoom operation portion is provided on the lens side and a primary control of the preset zoom operation or the shuttle shot zoom operation is carried out by the lens microcomputer. In a fourth embodiment of the present invention, as shown in FIG. 18, the preset zoom operation portion or the shuttle shot zoom operation portion 1818 is provided on the side of the camera body, and in addition, the primary control of the preset zoom operation or the shuttle shot zoom operation is carried out by a camera microcomputer 1811.

Note that the constitution of the photographing system of this embodiment is the same as that of the third embodiment except that the preset zoom operation portion or the shuttle shot zoom operation portion 1818 is provided on the side of the camera body. The common constituent elements are indicated with reference numerals in the eighteen hundreds of which the last two digits are the same as those of reference numerals in the fourteen hundreds in the third embodiment.

In addition, in this embodiment as well, the optical-zoom region and the digital zoom region do not overlap each other and the zoom position belongs only to either one of the optical-zoom region and the digital zoom region. However, a region in which the optical-zoom region and the digital zoom region overlap each other may be provided as will be described below.

In addition, just as explained in the third embodiment, it is possible in this embodiment also to carry out the preset zoom operation and the shuttle shot zoom operation across the optical-zoom region and the digital zoom region. The specific processings of the preset zoom operation and the shuttle shot zoom operation are basically the same as those explained in the first and the second embodiments. In this embodiment, the camera microcomputer 1811 functions as zoom control means and the lens microcomputer 1813 performs the optical-zoom in accordance with an optical-zoom command received from the camera microcomputer 1811 via a zoom lens driving portion 1816 and a focus lens driving portion 1815.

Figure 19:
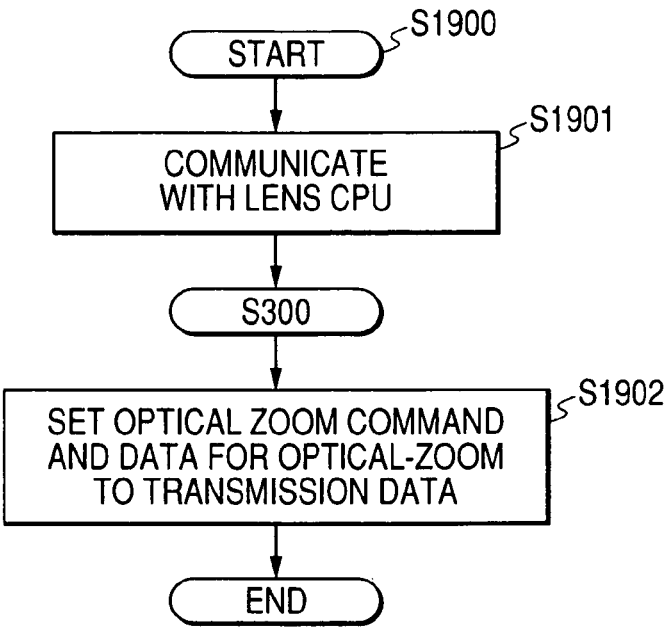
FIG. 19 is a flow chart explaining an operation of the camera microcomputer according to the fourth embodiment of the present invention.

Here, explanation will now be made as to a communication processing between the camera microcomputer 1811 and the lens microcomputer-1813. First, an operation flow chart of the camera microcomputer 1811 is shown in FIG. 19.

First, in S1901, the camera microcomputer 1811 communicates with the lens microcomputer 1813 and receives the optical-zooming information and the like on the lens side. The camera microcomputer 1811 sends the optical-zoom command and optical-zooming control data (data as to the zooming speed and the direction of zooming) to the lens microcomputer 1813. Then, the preset zoom operation subroutine S300 described in FIGS. 3A and 3B of the first embodiment is called to carry out the processing necessary for the preset zoom operation. In addition, on the basis of the processing, in S1902, the optical-zoom command and the control data for optical-zoom to be transmitted to the lens microcomputer 1813 in the next communication are set in the transmission data.

Figure 20:
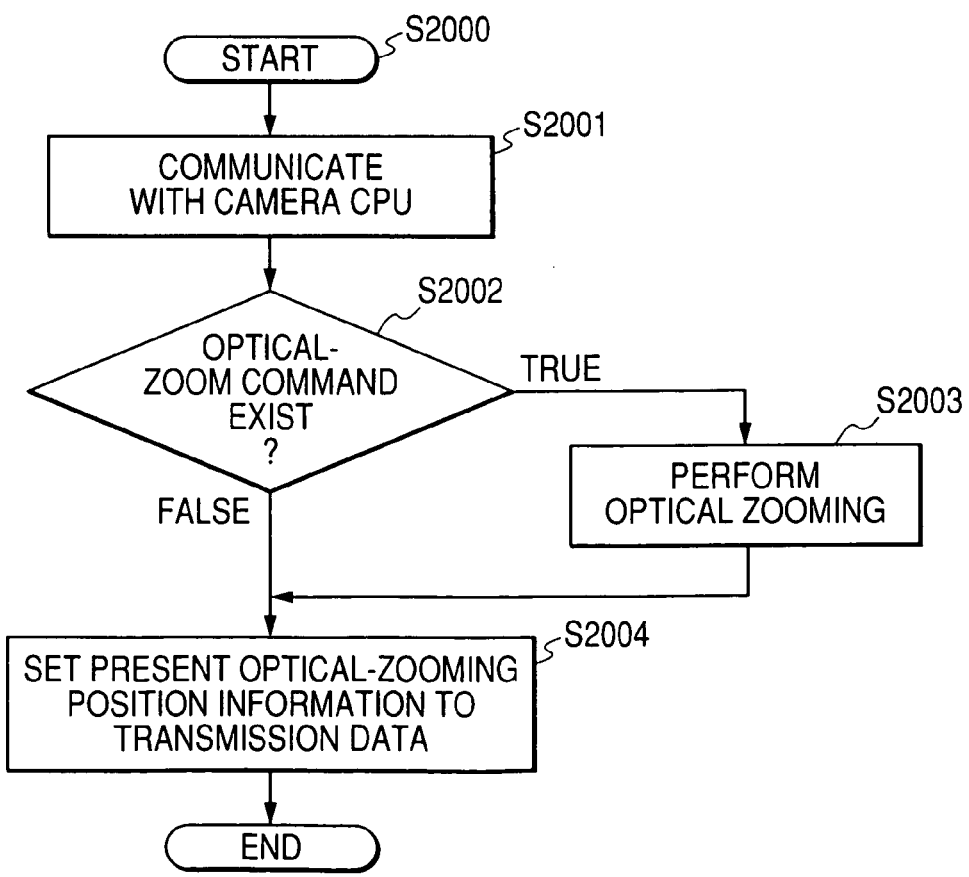
FIG. 20 is a flow chart explaining an operation of the lens microcomputer according to the fourth embodiment of the present invention.

Next, an operation flow chart of the lens microcomputer 1813 is shown in FIG. 20. First, in S2001, the lens microcomputer 1813 communicates with the camera microcomputer 1811. Through this communication, the lens microcomputer 1813 receives an optical zoom command from the camera microcomputer 1811. Then, in S2002, it is determined whether the optical zoom command is received or not. If the optical zoom command is received, the optical-zoom is performed in S2003 in response to the command. Then, the processing proceeds to S2004.

On the other hand, in a case where the optical-zoom command is not received in S2002, the processing proceeds to S2004. In S2004, for the next communication with the camera microcomputer 1811, present optical-zooming information is set in transmission data. Then, the processing ends. The processing in S2000 is carried out at regular time intervals, and information is exchanged between the lens microcomputer 1813 and the camera microcomputer 1811.

Figure 21:
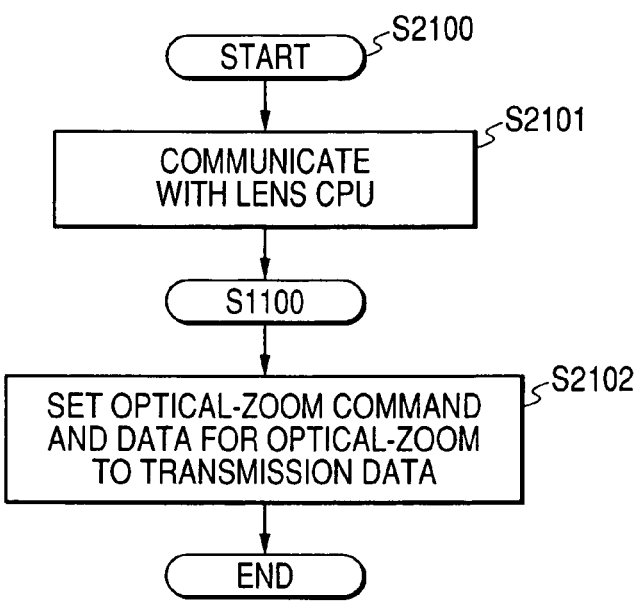
FIG. 21 is a flow chart explaining an operation of the camera microcomputer according to the fourth embodiment of the present invention.

In addition, the shuttle shot zoom operation can be carried out by substituting the operation flow chart shown in FIG. 19 with an operation flow chart shown in FIG. 21. More specifically, S300 shown in FIG. 19 is substituted with S1100 as described in the second embodiment with reference to FIGS. 11A, 11B, 12A and 12B.

As is described above, according to this embodiment, in an interchangeable lens type photographing system, it becomes possible to implement the preset zoom operation and the shuttle shot zoom operation across the optical-zoom region and the digital zoom region.

In the third and fourth embodiments which are mentioned above, explanation is made as to a case where the preset zoom operation portion or the shuttle shot zoom operation portion is integrated in one operation portion and is provided on the side of the lens or the camera body together with the zoom operation portion. However, each of these portions may be provided separately to the lens side and the camera body side. In addition, in each of the embodiments mentioned above, explanation is made as to a case where the preset zoom operation portion or the shuttle shot zoom operation portion is integrally provided to the lens-incorporated camera, interchangeable lens, or the camera body. However, the preset zoom operation portion or the shuttle shot zoom operation portion may be made connectable to the lens-incorporated camera, interchangeable lens, or the camera body as an independent control unit.

In addition, in each of the embodiments mentioned above, explanation is made as to a case where the memory zoom operation is carried out from the arbitrary zoom position in one of the optical-zoom region and the digital zoom region which do not overlap each other to the stored preset position (or the cancellation position) in the other region. However, the present invention can be applied to a case where the optical-zoom region and the digital zoom region overlap each other.

Fifth Embodiment

Figure 22:
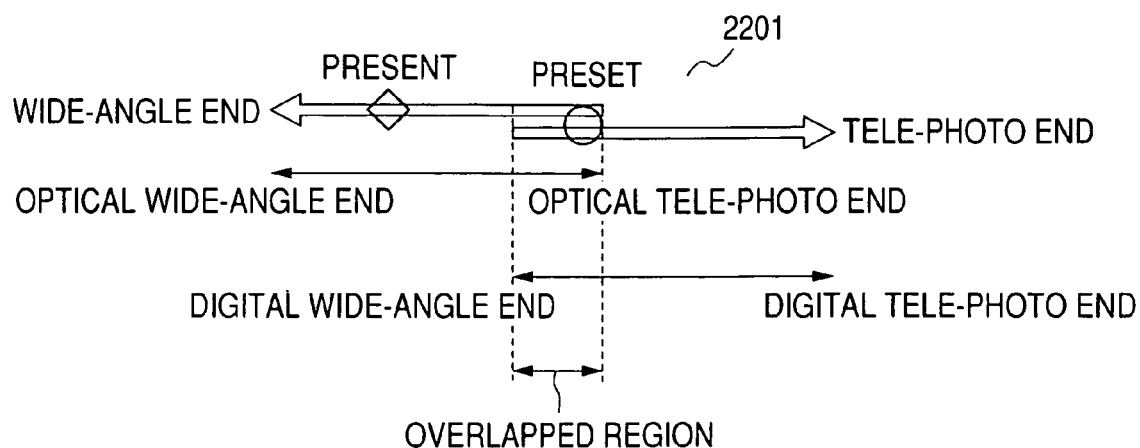
FIG. 22 is a diagram showing a zoom range in a photographing system according to a fifth embodiment of the present invention.

FIG. 22 shows a zoom range of the photographing system according to a fifth embodiment of the present invention, in which the optical-zoom region and the digital zoom region overlap each other. FIG. 22 shows a case, for example, where the present zoom position (indicated by a rhombus) is located in the optical-zoom region and the preset position (indicated by a circle) is located in an overlap region in which the optical-zoom region and the digital zoom region overlap each other, in other words, the preset position is located in the digital zoom region. The present zoom position may be located in the digital zoom region and the preset position may be located in the overlap region (in other words, the optical-zoom position), although not shown.

As described above, the preset position can be also stored in the overlap region, whereby usability of the photographing system can further be enhanced.

This application claims priority from Japanese Patent Application No. 2004-224778 filed on Jul. 30, 2004, which is hereby incorporated by reference herein.

What is claimed is:

1. An optical apparatus, comprising:
    optical-zooming means for optically zooming an object image in an optical zooming area;
    image pickup means for picking up the object image;
    digital-zooming means for electrically zooming, in an electrical zooming area, the object image picked up by the image pickup means;
    storage means for storing a present zooming state of the optical-zooming means and/or a present zooming state of the digital-zooming means in response to an operation of a first operation portion;
    determination means for determining whether the stored zooming state is in the optical zooming area and/or in the electrical zooming area based on the stored zooming state; and
    zooming control means for controlling the driving of the optical-zooming means and/or the digital-zooming means to the stored zooming state based on the result of the determination means in response to a second operation portion.

2. An optical apparatus according to claim 1, further comprising:

an interchangeable lens having the optical-zooming means; and a camera portion having the image pickup means.

3. An optical apparatus according to claim 1, further comprising:

switching means for inhibiting the digital-zooming, wherein when the second operation portion is operated, the switching means is set to be disabled.

4. An optical apparatus according to claim 1, further comprising:

switching means for inhibiting the digital-zooming, wherein when the second operation portion is not operated, the digital-zooming is set to be inhibited.

* * * * *

UNITED STATES PATENT AND TRADEMARK OFFICE
CERTIFICATE OF CORRECTION

PATENT NO. : 7,362,966 B2
APPLICATION NO. : 11/185653
DATED : April 22, 2008
INVENTOR(S) : Minoru Uchiyama It is certified that error appears in the above-identified patent and that said Letters Patent is hereby corrected as shown below:

Column 11, line 55, delete "(S1109)" and insert -- (S1100) --

Signed and Sealed this

Ninth Day of December, 2008

JON W. DUDAS
*Director of the United States Patent and Trademark Office*

UNITED STATES PATENT AND TRADEMARK OFFICE
CERTIFICATE OF CORRECTION

PATENT NO.       : 7,362,966 B2
APPLICATION NO.  : 11/185653
DATED            : April 22, 2008
INVENTOR(S)      : Minoru Uchiyama Page 1 of 1

It is certified that error appears in the above-identified patent and that said Letters Patent is hereby corrected as shown below:

Column 11, line 55, delete "(S1109)" and insert -- (S1100) --

Signed and Sealed this

Twenty-third Day of December, 2008

JON W. DUDAS
*Director of the United States Patent and Trademark Office*

UNITED STATES PATENT AND TRADEMARK OFFICE
CERTIFICATE OF CORRECTION

PATENT NO. : 7,362,966 B2
APPLICATION NO. : 11/185653
DATED : April 22, 2008
INVENTOR(S) : Minoru Uchiyama It is certified that error appears in the above-identified patent and that said Letters Patent is hereby corrected as shown below:

This certificate vacates the Certificate of Correction issued December 23, 2008. The certificate is a duplicate of the Certificate of Correction issued December 9, 2008. All requested changes were included in the Certificate of Correction issued December 9, 2008.

Signed and Sealed this

Third Day of February, 2009

JOHN DOLL
*Acting Director of the United States Patent and Trademark Office*